US012638835B2

(12) United States Patent
Pringle

(10) Patent No.: US 12,638,835 B2
(45) Date of Patent: May 26, 2026

(54) METHOD FOR CUSTOMIZED PRODUCT MANUFACTURING USING AN INTEGRATED SYSTEM

(71) Applicant: Gildform Inc., Detroit, MI (US)

(72) Inventor: Karissma Y. Pringle, Detroit, MI (US)

(73) Assignee: Gildform Inc., Detroit, MI (US)

( * ) Notice: Subject to any disclaimer, the term of this patent is extended or adjusted under 35 U.S.C. 154(b) by 396 days.

(21) Appl. No.: 18/496,092

(22) Filed: Oct. 27, 2023

(65) Prior Publication Data

US 2024/0142957 A1 May 2, 2024

Related U.S. Application Data

(60) Provisional application No. 63/420,926, filed on Oct. 31, 2022.

(51) Int. Cl.
 *G06F 3/048* (2013.01)
 *G05B 19/418* (2006.01)
(52) U.S. Cl.
 CPC . *G05B 19/41865* (2013.01); *G05B 19/41875* (2013.01)
(58) Field of Classification Search
 CPC ..................... G05B 19/41865; G05B 19/41875
 See application file for complete search history.

(56) References Cited

U.S. PATENT DOCUMENTS 7,499,871 B1 3/2009 McBrayer et al.
9,323,247 B2 * 4/2016 Dillon ................ G05B 23/0272

10,417,718 B2 9/2019 Mishra et al.
11,415,961 B1 8/2022 Jacobs, II et al.
2002/0107672 A1 8/2002 Povich
2005/0096774 A1 * 5/2005 Bayoumi ............... G06Q 10/06
700/109

(Continued)

FOREIGN PATENT DOCUMENTS

WO 2008144662 A1 11/2008

OTHER PUBLICATIONS

"Custom Jewelry", website, US, https://customjewelry.com/.
Written Opinion of the International Searching Authority dated Mar. 18, 2024.

*Primary Examiner* — David Phantana-angkool
(74) *Attorney, Agent, or Firm* — Jacob M. Ward; Ward Law Office LLC

(57) ABSTRACT

The present disclosure provides a method for manufacturing a product customized by a customer. The method involves utilizing a system server comprising various modules, including a production module, an enterprise resource planning (ERP) module, a marketplace module, and a platform module. The ERP module is in communication with the production module and includes an administrator interface and a manufacturing operator interface. The method includes steps such as permitting the customer to provide a product model or request a model from a third-party designer, selecting a manufacturing operator based on attributes, assigning the model to the manufacturing operator, monitoring the manufacturing process in real-time, completing quality checks, verifying quality check attributes, generating or repeating processing steps based on quality check results, calculating pricing attributes, completing the manufacturing process, and delivering the customized product to the customer or a third party.

20 Claims, 25 Drawing Sheets

(56)     References Cited

U.S. PATENT DOCUMENTS

| | | | |
|---|---|---|---|
| 2013/0079896 A1* | 3/2013 | Harjunkoski | G05B 11/01 |
| | | | 700/9 |
| 2013/0138529 A1 | 5/2013 | Hou | |
| 2014/0142737 A1* | 5/2014 | Tanna | G06Q 10/06375 |
| | | | 700/99 |
| 2016/0070258 A1* | 3/2016 | Raviola | G06Q 10/06 |
| | | | 700/100 |
| 2018/0094953 A1* | 4/2018 | Colson | G06Q 10/0833 |
| 2021/0256580 A1* | 8/2021 | Norman | G06F 30/12 |
| 2022/0164745 A1 | 5/2022 | Dibble et al. | |
| 2022/0198079 A1 | 6/2022 | Comploi et al. | |
| 2023/0222454 A1* | 7/2023 | Cella | G06N 5/01 |
| | | | 705/28 |
| 2024/0142957 A1* | 5/2024 | Pringle | G06Q 10/06395 |
| 2024/0144141 A1* | 5/2024 | Cella | G06Q 30/0202 |
| 2025/0021087 A1* | 1/2025 | Resag | G05B 19/41865 |
| 2025/0054008 A1* | 2/2025 | Cella | G06N 5/043 |

* cited by examiner

102

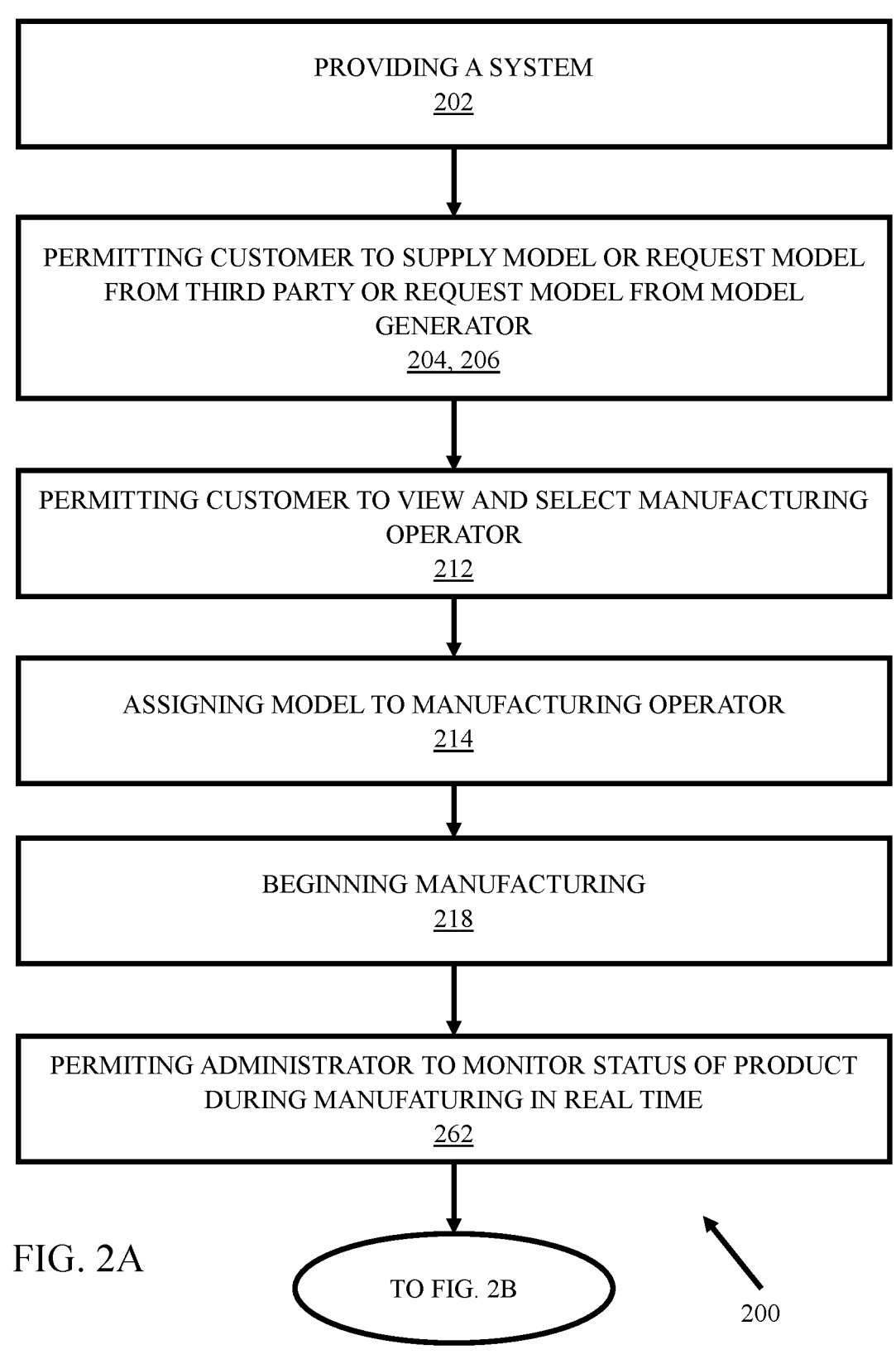

PROVIDING A SYSTEM
202

PERMITTING CUSTOMER TO SUPPLY MODEL OR REQUEST MODEL FROM THIRD PARTY OR REQUEST MODEL FROM MODEL GENERATOR
204, 206

PERMITTING CUSTOMER TO VIEW AND SELECT MANUFACTURING OPERATOR
212

ASSIGNING MODEL TO MANUFACTURING OPERATOR
214

BEGINNING MANUFACTURING
218

PERMITING ADMINISTRATOR TO MONITOR STATUS OF PRODUCT DURING MANUFATURING IN REAL TIME
262

PROVIDING A SYSTEM
202

PERMITTING CUSTOMER TO SUPPLY MODEL OR REQUEST MODEL FROM THIRD PARTY OR REQUEST MODEL FROM MODEL GENERATOR
204, 206

SELECTING PRODUCT ATTRIBUTES
208

MATCHING PRODUCT ATTRIBUTES AND MANUFACTURING OPERATOR
210

PERMITTING CUSTOMER TO VIEW AND SELECT MANUFACTURING OPERATOR
212

ASSIGNING MODEL TO MANUFACTURING OPERATOR
214

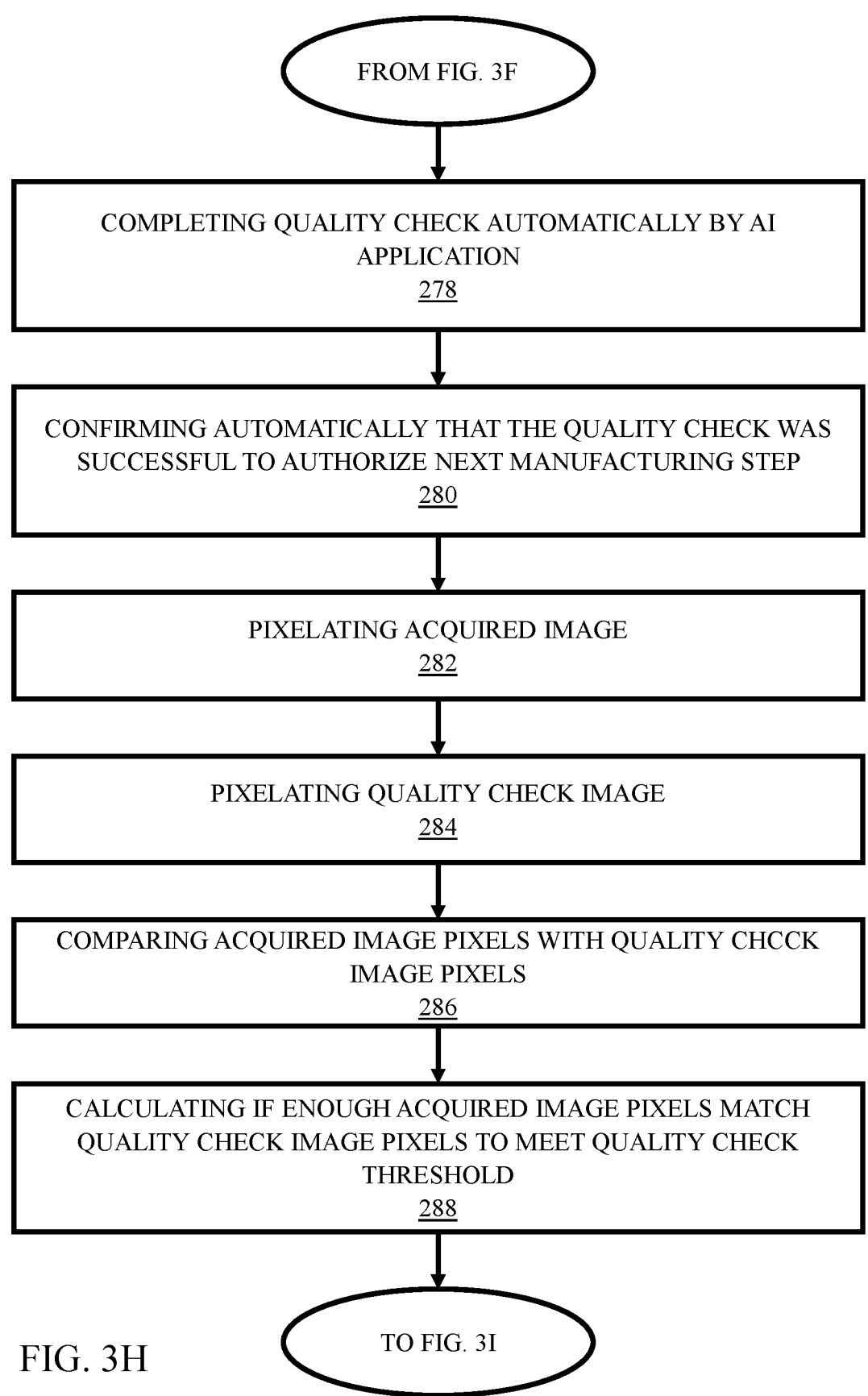

FROM FIG. 3F

COMPLETING QUALITY CHECK AUTOMATICALLY BY AI
APPLICATION
278

CONFIRMING AUTOMATICALLY THAT THE QUALITY CHECK WAS
SUCCESSFUL TO AUTHORIZE NEXT MANUFACTURING STEP
280

PIXELATING ACQUIRED IMAGE
282

PIXELATING QUALITY CHECK IMAGE
284

COMPARING ACQUIRED IMAGE PIXELS WITH QUALITY CHCCK
IMAGE PIXELS
286

CALCULATING IF ENOUGH ACQUIRED IMAGE PIXELS MATCH
QUALITY CHECK IMAGE PIXELS TO MEET QUALITY CHECK
THRESHOLD
288

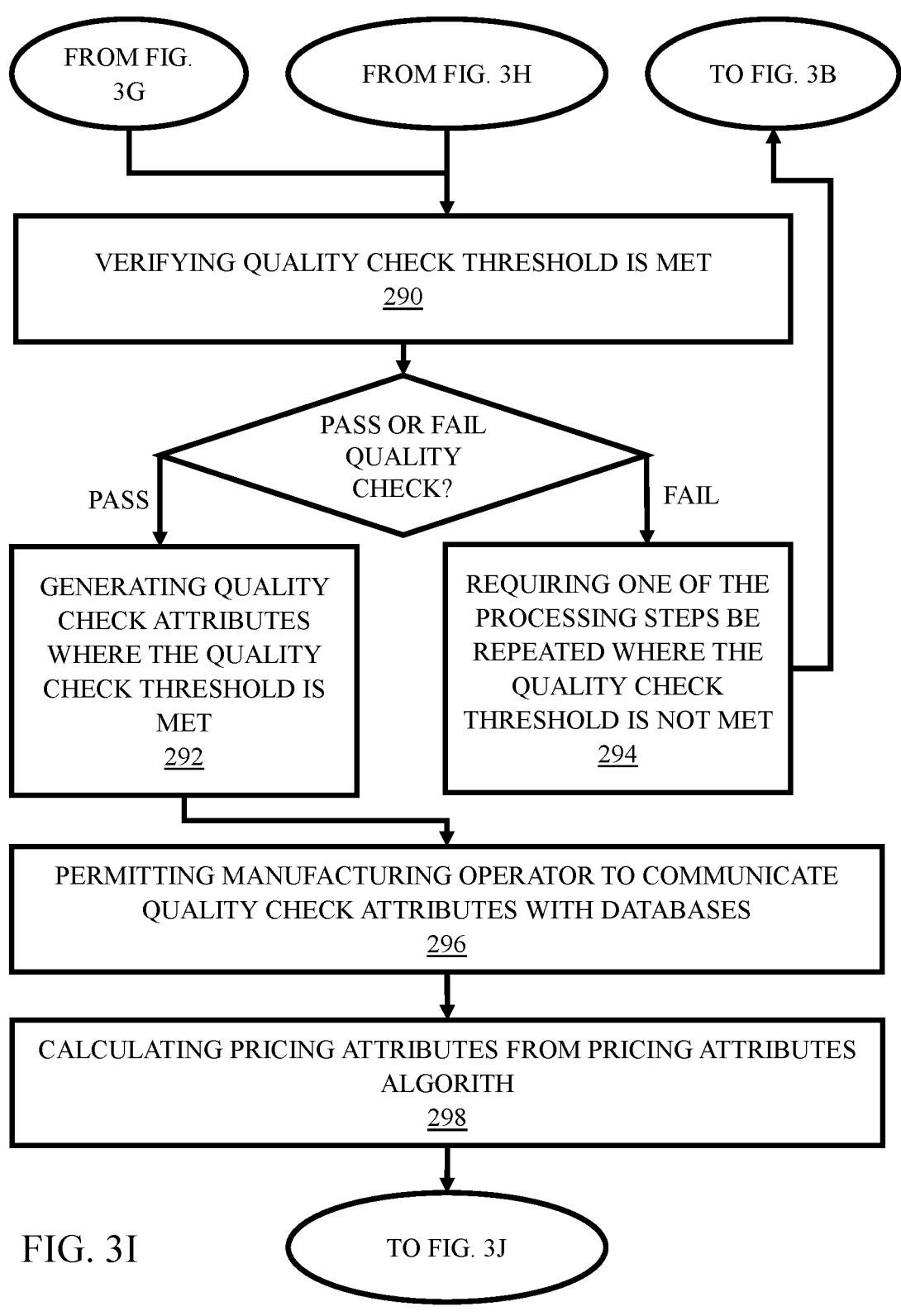

FROM FIG. 3G

FROM FIG. 3H

TO FIG. 3B

VERIFYING QUALITY CHECK THRESHOLD IS MET
290

PASS OR FAIL QUALITY CHECK?

PASS

FAIL

GENERATING QUALITY CHECK ATTRIBUTES WHERE THE QUALITY CHECK THRESHOLD IS MET
292

REQUIRING ONE OF THE PROCESSING STEPS BE REPEATED WHERE THE QUALITY CHECK THRESHOLD IS NOT MET
294

PERMITTING MANUFACTURING OPERATOR TO COMMUNICATE QUALITY CHECK ATTRIBUTES WITH DATABASES
296

CALCULATING PRICING ATTRIBUTES FROM PRICING ATTRIBUTES ALGORITH
298

FROM FIG. 3J

OBTAINING FROM DEFECT RATE DATASET A DEFECT RATE
DATASET VARIABLE
312

STORING PRICE INCREASE MARKUP VARAIBLE IN DATABASE
314

CALCULATING PRICING ATTRIBUTES WITH DEFECT RATE DATASET
VARAIBLE USING PRICING ATTRIBUTES ALGORITH
316

COMPLETING MANUFACTURING OF PRODUCT
318

DELIVERING PRODUCT TO CUSTOMER OR THIRD PARTY
320

FIG. 8 erp.company.com/production/order-items/1/4061

Figure 9:
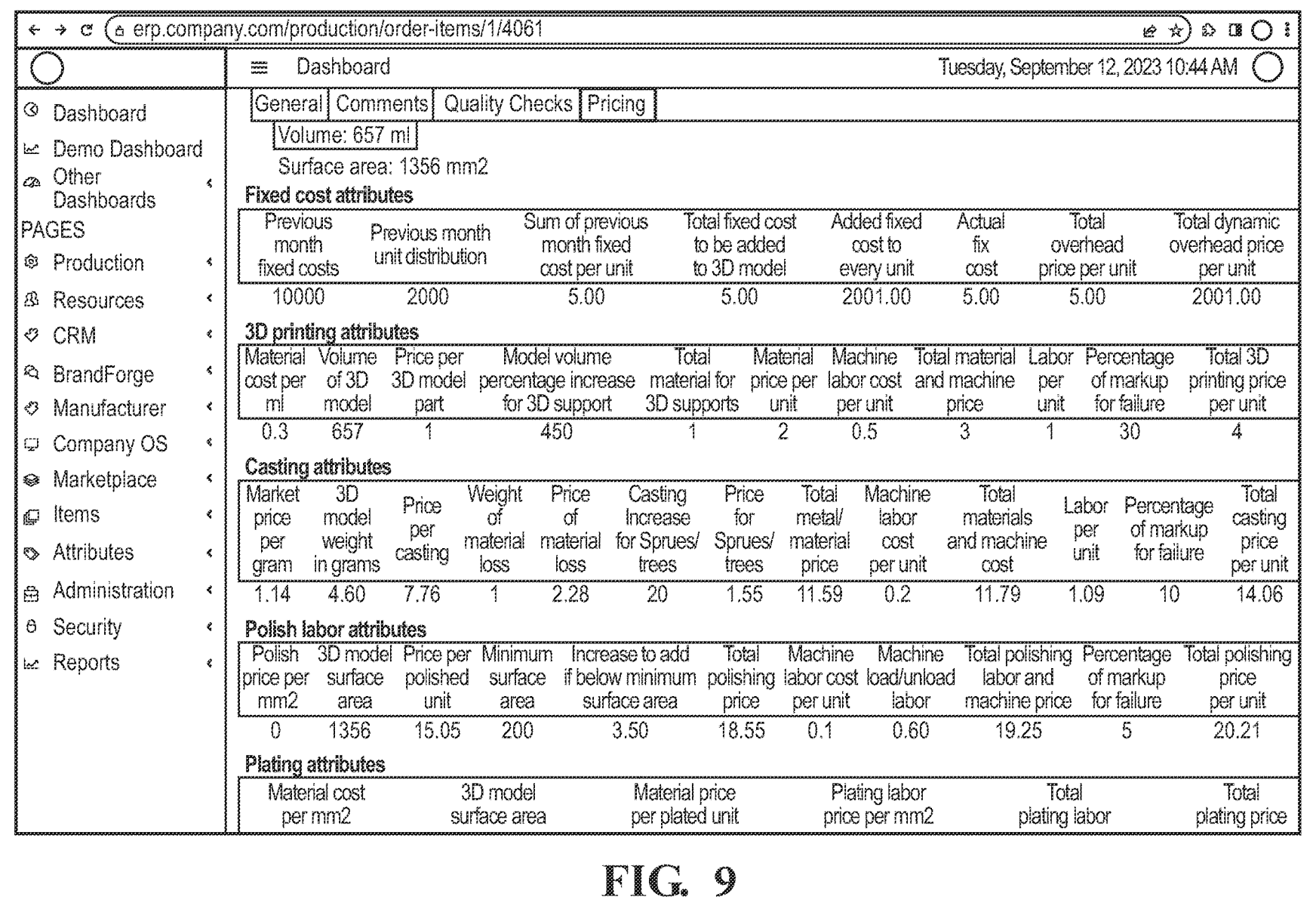

Tuesday, September 12, 2023 10:44 AM

Dashboard

General | Comments | Quality Checks | Pricing

PAGES
Dashboard
Demo Dashboard
Other Dashboards
Production
Resources
CRM
BrandForge
Manufacturer
Company OS
Marketplace
Items
Attributes
Administration
Security
Reports Volume: 657 ml
Surface area: 1356 mm2

Fixed cost attributes

| Previous month fixed costs | Previous month unit distribution | Sum of previous month fixed cost per unit | Total fixed cost to be added to 3D model | Added fixed cost to every unit | Actual fix cost | Total overhead price per unit | Total dynamic overhead price per unit |
|---|---|---|---|---|---|---|---|
| 10000 | 2000 | 5.00 | 5.00 | 2001.00 | 5.00 | 5.00 | 2001.00 |

3D printing attributes

| Material cost per ml | Volume of 3D model ml | Price per 3D model part | Model volume percentage increase for 3D support | Total material for 3D supports | Material price per unit | Machine labor cost per unit | Total material and machine labor cost per unit | Labor per unit | Percentage of markup for failure | Total 3D printing price per unit |
|---|---|---|---|---|---|---|---|---|---|---|
| 0.3 | 657 | 1 | 1 | 450 | 2 | 0.5 | 3 | 1 | 30 | 4 |

Casting attributes

| Market price per gram | Volume of 3D model weight in grams | Price per casting | Weight of material loss | Price of material loss | Casting increase for Sprues/trees | Price for Sprues/trees | Total metal/material price | Machine labor cost per unit | Total materials and machine cost | Labor per unit | Percentage of markup for failure | Total casting price per unit |
|---|---|---|---|---|---|---|---|---|---|---|---|---|
| 1.14 | 4.60 | 7.76 | 1 | 2.28 | 20 | 1.55 | 11.59 | 0.2 | 11.79 | 1.09 | 10 | 14.06 |

Polish labor attributes

| Polish price per mm2 | 3D model surface area | Price per polished unit | Minimum polished surface area | Increase to add if below minimum surface area | Total polishing labor cost | Machine labor cost per unit | Machine load/unload labor | Total polishing labor and machine price | Percentage of markup for failure | Total polishing price per unit |
|---|---|---|---|---|---|---|---|---|---|---|
| 0 | 1356 | 15.05 | 200 | 3.50 | 18.55 | 0.1 | 0.60 | 19.25 | 5 | 20.21 |

Plating attributes

| Material cost per mm2 | Material price per plated unit | Plating labor price per mm2 | Total plating labor | Total plating price per unit |
|---|---|---|---|---|

METHOD FOR CUSTOMIZED PRODUCT MANUFACTURING USING AN INTEGRATED SYSTEM

CROSS-REFERENCE TO RELATED APPLICATIONS

This application claims the benefit of U.S. Provisional Application No. 63/420,926, filed on Oct. 31, 2022. The entire disclosure of the above application is hereby incorporated herein by reference.

FIELD

The present technology relates to custom product manufacturing and, more particularly, to utilizing an ERP for custom product manufacturing.

INTRODUCTION

This section provides background information related to the present disclosure which is not necessarily prior art.

Custom product manufacturing is a highly dynamic and intricate sector that relies heavily on efficient and organized processes to meet the diverse demands of customers. Enterprise Resource Planning (ERP) systems have become indispensable tools for manufacturers in the industry. These systems facilitate the seamless integration of various business functions, helping companies streamline their operations, enhance productivity, and ensure customer satisfaction.

One key advantage of utilizing an ERP in custom product manufacturing is improved demand forecasting. ERP systems are equipped with advanced forecasting modules that enable manufacturers to anticipate customer orders accurately. By analyzing historical data market trends, and previous order data, they can adjust production schedules, manage inventory levels, optimize resource allocation, and improve product quality. This, in turn, reduces overproduction and minimizes the risk of manufacturing defects, leading to better resource utilization and cost savings.

In custom product manufacturing, flexibility and responsiveness are paramount. ERP systems excel in helping manufacturers adapt to changing customer demands. They offer real-time visibility into the production process, enabling quick adjustments to schedules and resource allocation when new custom orders come in. This agility can be a game-changer in satisfying customer requirements and maintaining a competitive edge in the market.

ERP also plays a critical role in ensuring the efficient use of resources. By centralizing data and integrating different departments, manufacturers can optimize their resource allocation, including materials, labor, and machinery. This resource optimization not only enhances cost efficiency but also reduces waste, making custom product manufacturing more environmentally sustainable.

Quality control and compliance are vital in the manufacturing industry, especially when producing custom products. ERP systems enable manufacturers to monitor and control the quality of their products throughout the production process. With built-in quality assurance features and tracking capabilities, they can easily trace the origins of any defects and take corrective actions promptly. This ensures that custom products meet the high standards and specifications set by customers, which is critical for maintaining a positive reputation and customer trust.

However, due to the complexity of ERP systems and the significant customization required to align with a manufacturer's unique processes and requirements, ERP systems can result in extended implementation timelines and increased chances of errors during the customization process. Additionally, the ability to integrate several manufacturers within one system without an administrator can result in a variety of manufacturing timelines and can result in varied user experience and expectations.

Accordingly, there is a need for an ERP system utilized in custom product manufacturing that allows for the user, the manufacturer, and an administrator to interact with each other, manage the manufacturing process, and increase product quality.

SUMMARY

In concordance with the instant disclosure, an ERP system utilized in custom product manufacturing that allows for the user, the manufacturer, and an administrator to interact with each other, manage the manufacturing process, and increase product quality, has surprisingly been discovered.

The present technology includes articles of manufacture, systems, and processes that relate to custom product manufacturing.

In one embodiment, the techniques described herein relate to a system for manufacturing a product customized by a customer. The system can include a system server having a processor and a memory on which a plurality of modules including tangible, non-transitory, processor executable instructions are stored. The plurality of modules can include a production module, an enterprise resource planning (ERP) module, a marketplace module, and a platform module. The platform module can be in communication with the marketplace module and the ERP module and the ERP module in communication with the production module. The ERP module can be configured to generate an administrator interface and a manufacturing operator interface. The administrator interface can permit interaction with the system server by an administrator and the manufacturing operator interface can permit interaction with the system server by a manufacturing operator. The manufacturing operator can have a manufacturing process with a plurality of processing steps. The ERP module can further have a plurality of databases wherein at least one of the plurality of databases stores product attributes, quality check attributes, and pricing attributes. The manufacturing operator attributes can include at least one of a workflow dataset having a plurality of processing steps associated with a workflow of the manufacturing operator, a defect rate dataset, a success rate dataset, and a labor dataset.

In another embodiment, the techniques described herein relate to a method for manufacturing a product customized by a customer. The method can include a step of providing the system. The method further includes a step of permitting the customer, by the platform module, to view the manufacturing operator attributes and the product attributes and select the manufacturing operator based on the manufacturing operator attributes, the product attributes, and the pricing attributes. The method also includes assigning to the manufacturing operator selected by the customer, by the ERP module, the model of the product to be manufactured by the manufacturing process and beginning a manufacturing of the product, by the manufacturing operator, based on the model of the product and the manufacturing process. The method includes permitting the administrator, by the administrator interface of the ERP module, to monitor a status of at least one of the plurality of processing steps of the manufacturing process in real-time. The method further includes permitting the manufacturing operator, by the manufacturing operator interface of the ERP module, to complete a quality check of at least one of the plurality of processing steps of the manufacturing process for the product and verifying by at least one of the manufacturing operator and the administrator, by at least one of the manufacturing operator interface and the administrator interface, that the quality check attributes associated with the quality check satisfy a predetermined quality check threshold. The method includes a step one of: generating, by the ERP module, the quality check attributes associated with the quality check of at least one of the plurality of processing steps of the manufacturing process for the product where the quality check does satisfy the predetermined quality check threshold, and requiring, by the ERP module, that one of the plurality of processing steps associated with the quality check be repeated where the quality check does not satisfy the predetermined quality check threshold. The method includes a step of permitting the manufacturing operator, by the manufacturing operator interface, to communicate the quality check attributes associated with the quality check of at least one of the plurality of processing steps to the plurality of databases. The present method includes a step of calculating, by the ERP module, the pricing attributes associated with the manufacturing operator based on a pricing attributes algorithm, the pricing attributes algorithm including at least the quality check attributes stored on the plurality of databases and associated with the manufacturing operator and completing the manufacturing of the product by the manufacturing operator. The method may then include a step of delivering the product from the manufacturing operator to the customer or a third party. A customized product is thereby provided.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIGS. 2A to 2C are flowcharts depicting a method for manufacturing a product customized by a customer, according to one embodiment of the present disclosure;

FIGS. 3A to 3K are flowcharts depicting a method for manufacturing a product customized by a customer, according to another embodiment of the present disclosure;

FIG. 5 is an illustration of a user interface for depicting a projects database of an ERP module on an administrator interface of the implementation shown in FIG. 4;

FIG. 6 is an illustration of a user interface for depicting a product attribute of the ERP module on the administrator interface of the implementation shown in FIG. 4;

FIG. 7 is an illustration of a user interface for depicting a defect rate dataset of the ERP module on the administrator interface of the implementation shown in FIG. 4;

FIG. 8 is an illustration of a user interface for depicting a fixed cost attribute of the ERP module on the administrator interface of the implementation shown in FIG. 4;

FIG. 9 is an illustration of a user interface for depicting a pricing attribute of the ERP module on the administrator interface of the implementation shown in FIG. 4;

FIG. 11 is an illustration of a user interface for depicting a quality check of at least one of a plurality of processing steps of the ERP module on the manufacturing operator interface of the implementation shown in FIG. 4.

DETAILED DESCRIPTION

Figure 1A:
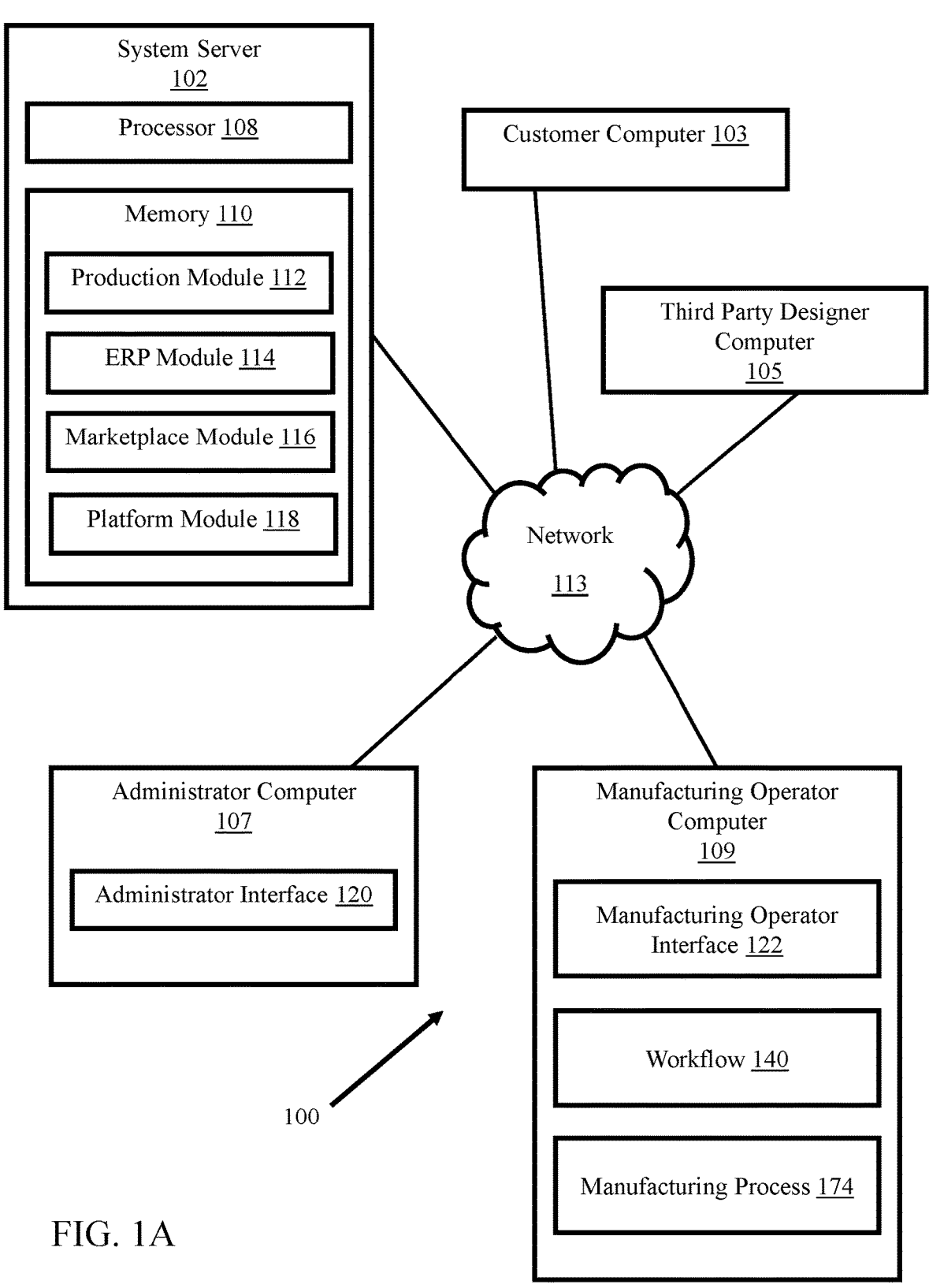
FIG. 1A is a schematic depicting a system for manufacturing a customized product, according to one embodiment of the disclosure.

The following description of technology is merely exemplary in nature of the subject matter, manufacture, and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that can be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it can be directly on, engaged, connected, or coupled to the other element or layer, or intervening elements or layers can be present. In contrast, when an element is referred to as being "directly on," "directly engaged to," "directly connected to" or "directly coupled to" another element or layer, there can be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, can be used herein for ease of description to describe one element or feature's relationship to another element(s) or feature(s) as illustrated in the figures. Spatially relative terms can be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

The present technology includes a method for manufacturing a product 101 customized by a customer. In one non-limiting example, the customer can work with a third-party designer on a third-party designer computer 105, an administrator using an administrator computer 107, and a manufacturing operator using a manufacturing operator computer 109 to create a customized model 111 and, subsequently, the product 101 based on the customized model 111. During the designing and manufacturing process, data-sets can be collected and/or provided by one or more of the customer, third parties, administrative parties, artificial intelligence models such as large language models (LLM), and any combination thereof, as non-limiting examples. Datasets can also be interpretated, interrogated, manipulated, and otherwise analyzed by third parties, administrators, manufacturing operators, artificial intelligence models, and any combination thereof, as non-limiting examples.

The purpose of the method can be to facilitate a manufacturing process with a series of quality checks dependent upon the manufacturing process and, subsequently, produce a customized product with as few defects as possible. By monitoring the manufacturing process in this way, accurate product attributes, workflow, and pricing can be determined. Customers, administrators, and manufacturing operators can be individuals, groups, businesses, non-profits, and any combination thereof seeking goods, services, partnerships, and/or other opportunities in any suitable industry or combination of industries. In certain embodiments, one or more algorithms can be used to evaluate and compare pricing variables.

Figure 1B:
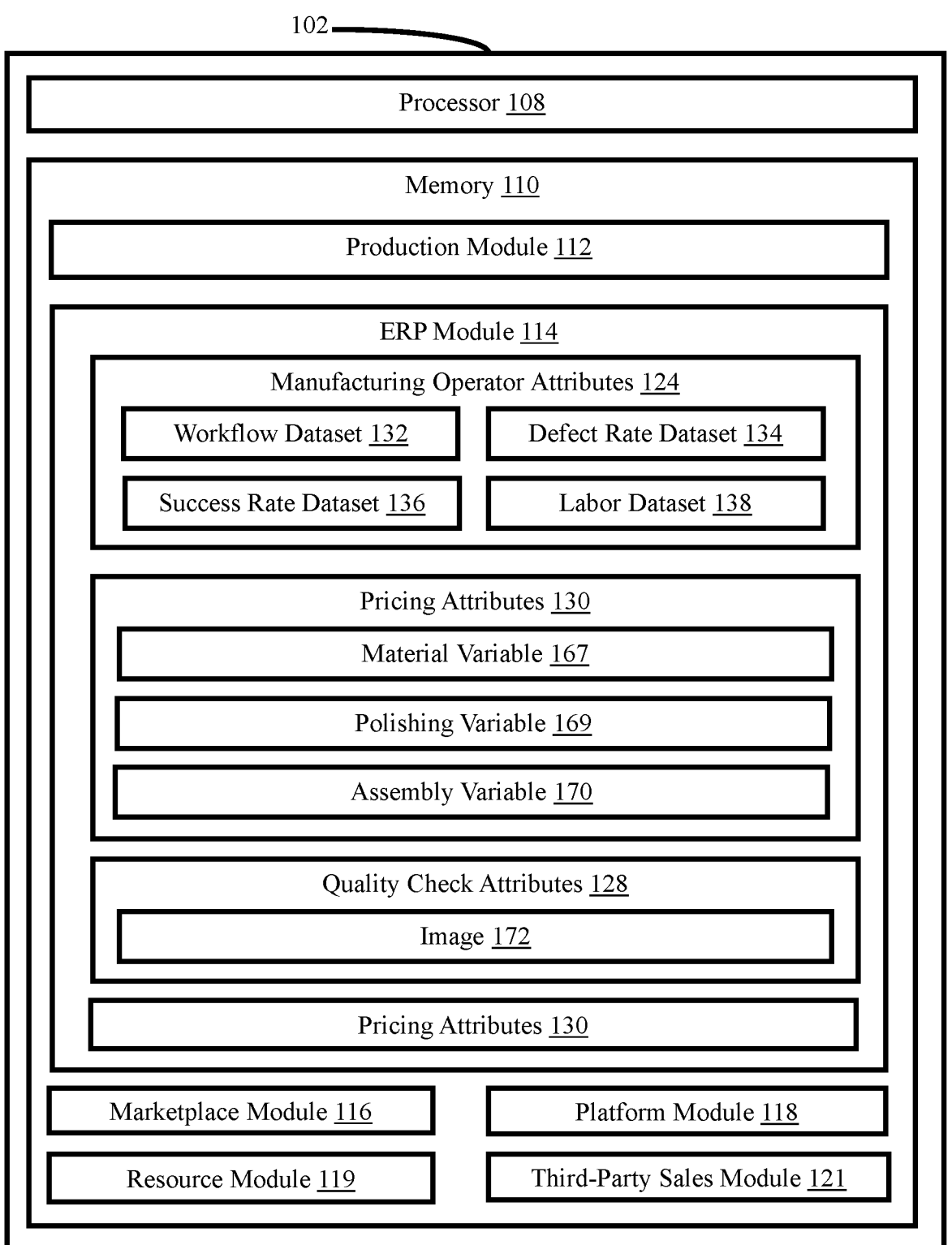
FIG. 1B is a schematic depicting a system server of the system shown in FIG. 1A.
Figure 1C:
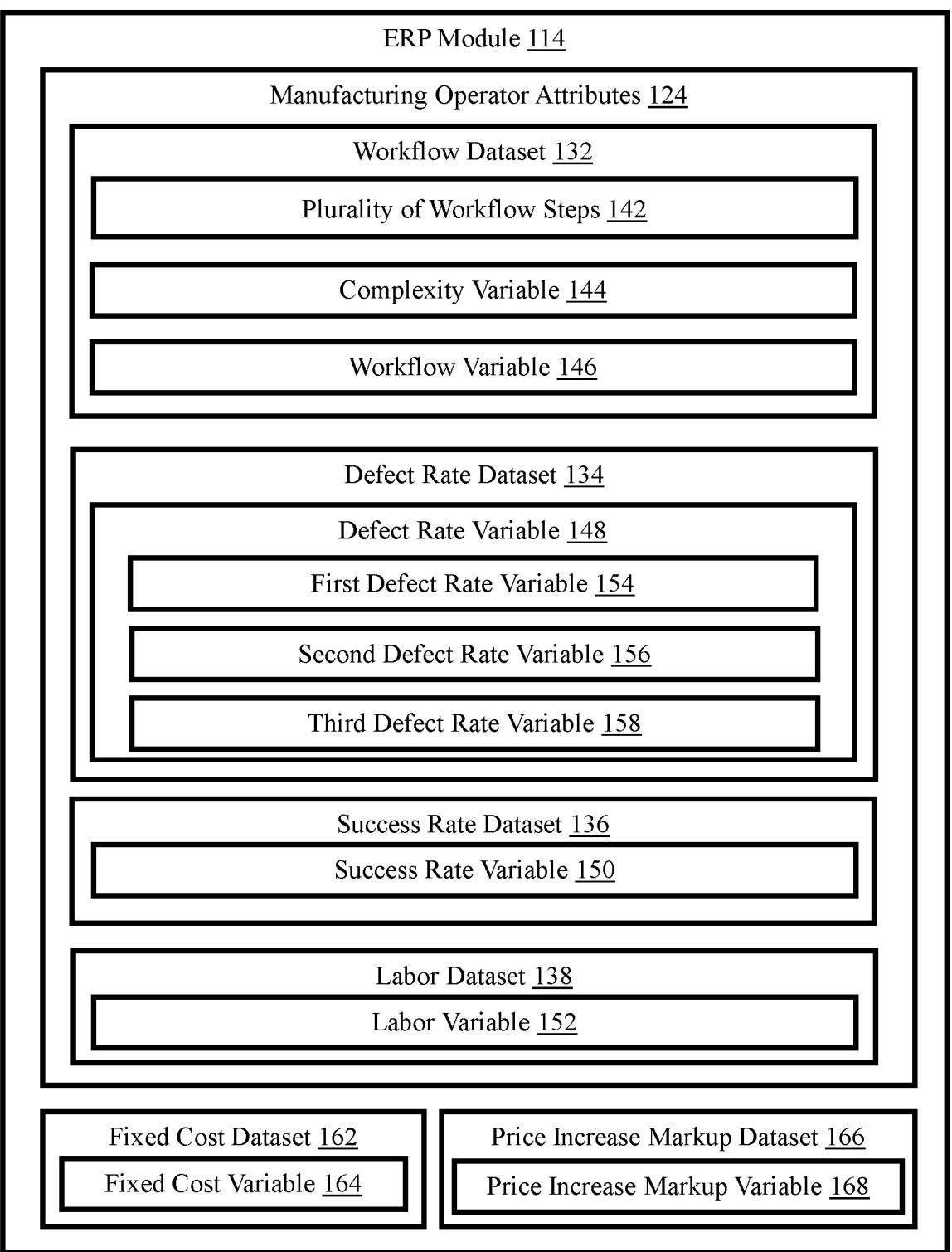
FIG. 1C is a schematic depicting an ERP module of the system server shown in FIG. 1A.
Figure 2B:
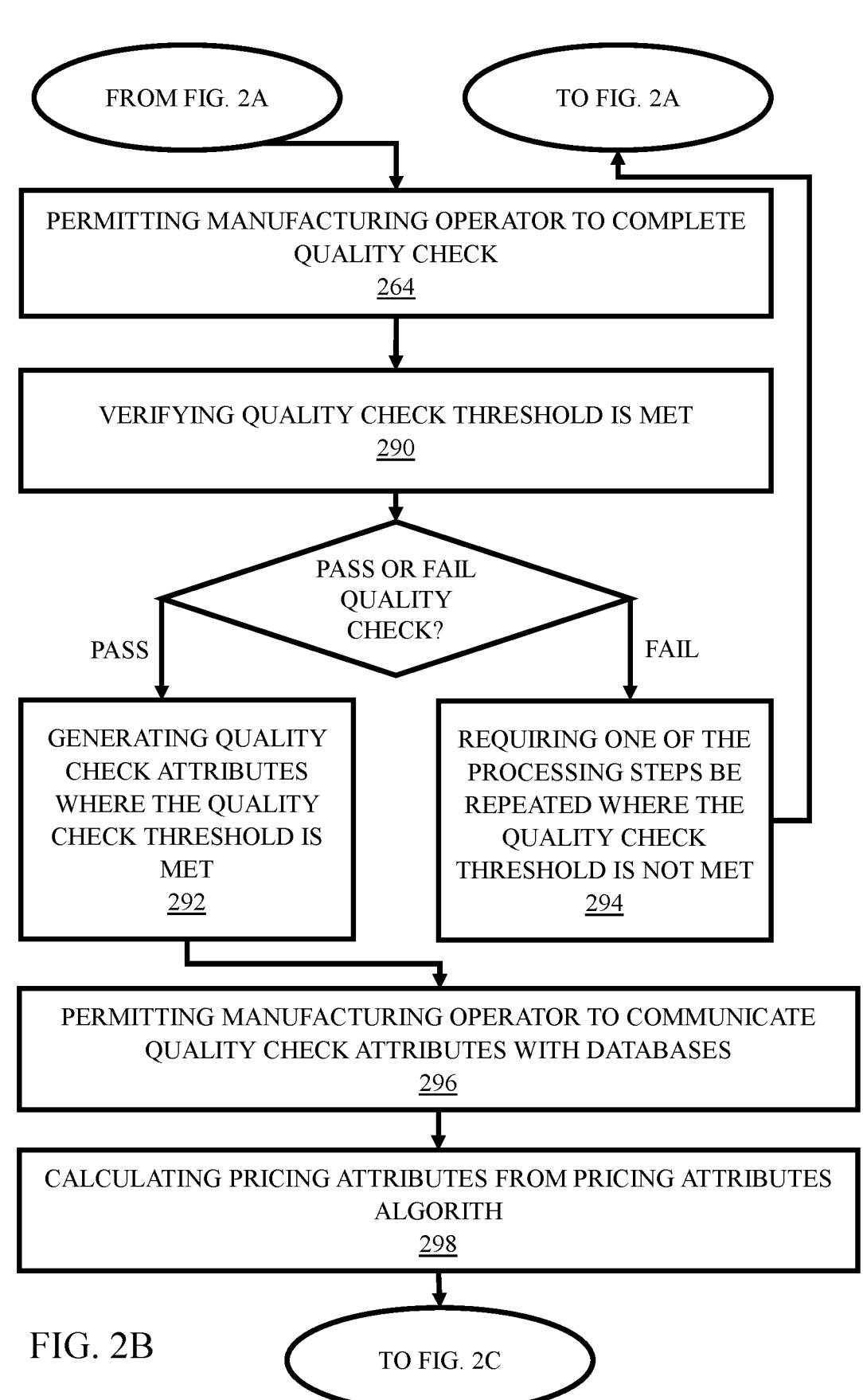
Figure 2C:
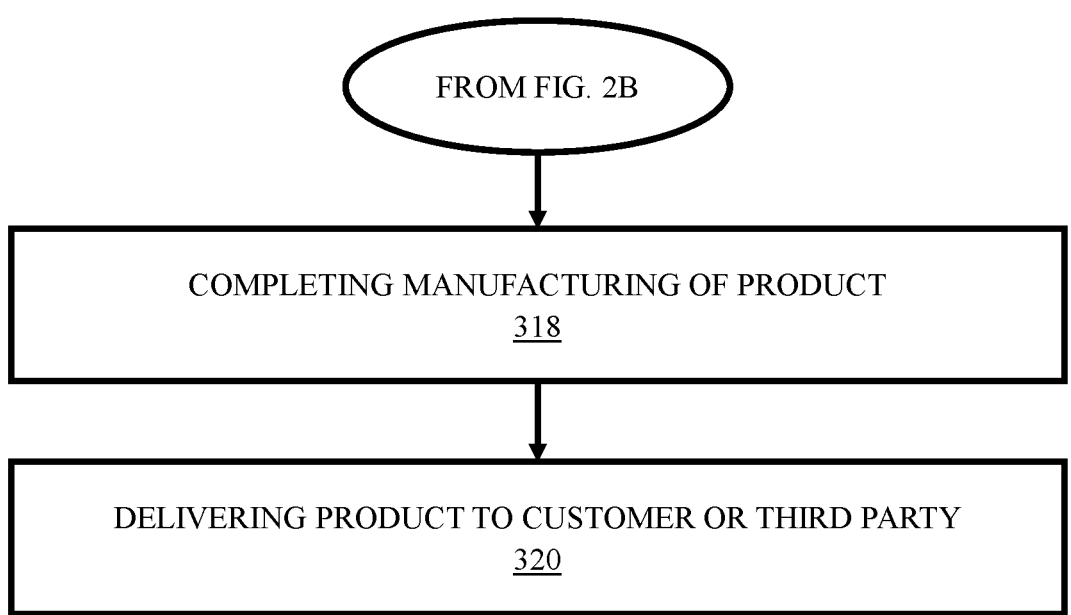

As shown in FIGS. 1A-1C, a system 100 is illustrated that is configured for manufacturing the product customized by the customer via a customer computer 103. For example, the product may be customized by a method 200 as shown in FIGS. 2A-2C and 3A-3K, and in accordance with one or more embodiments.

In some cases, as shown in FIGS. 1A-1C, the system 100 can include a one or more computing platforms in the form of at least one system server 102. The at least one system server 102 can be communicably coupled with a plurality of remote platforms, for example, via at least one network 113. In some cases, users can access the system 100 via the plurality of remote platforms. It should be appreciated that, depending on the situation, the at least one system server 102 can therefore be provided as either a standalone system or a distributed system with the steps distributed across more than one platform.

In some cases, the one or more computing platforms, can be communicatively coupled to the remote platforms. In some cases, the communicative coupling can include communicative coupling through a networked environment such as the at least one network 113. The networked environment can be a radio access network, such as LTE or 5G, a local area network (LAN), a wide area network (WAN) such as the Internet, or wireless LAN (WLAN), for example. It will be appreciated that this is not intended to be limiting, and that the scope of this disclosure includes implementations in which one or more computing platforms and remote platforms can be operatively linked via some other communication coupling. The one or more computing platforms can be configured to communicate with the at least one network 113 via wireless or wired connections. In addition, in an embodiment, the system server 102 can also include one or more hosts or servers, such as the at least one system server 102 connected to the network 113 through wireless or wired connections. According to one embodiment, the at least one system server 102 can be implemented in or function as base stations (which can also be referred to as Node Bs or evolved Node Bs (eNBs)). In other embodiments, the at least one system server 102 can include web servers, mail servers, application servers, etc. According to certain embodiments, the at least one system server 102 can be standalone servers, networked servers, or an array of servers. In an embodiment, the plurality of remote platforms can be configured to communicate directly with each other via wireless or wired connections. Examples of the plurality of remote platforms can include, but are not limited to, smartphones, wearable devices, tablets, laptop computers, desktop computers, Internet of Things (IoT) devices, or other mobile or stationary devices.

Referring again to FIG. 1A, the system 100 can be configured by machine readable instructions. The machine-readable instructions can include modules. Each module can include at least one of a database and an application. The database can include attributes associated with variables. In this aspect, the method 200 as shown in FIGS. 2A-2C and 3A-3K, can be configured to be implemented by the modules, which in turn can be implemented as one or more of functional logic, hardware logic, electronic circuitry, software modules, and the like.

The system 100 can include a system server 102 having a processor 108 and memory 110. The memory 110 can store a plurality of modules including tangible, non-transitory, processor executable instructions. With reference to FIGS. 1A and 1B, the plurality of modules can include a production module 112, an enterprise resource planning (ERP) module 114, a marketplace module 116, and a platform module 118.

In certain embodiments, the plurality of modules can further include a resource module 119, shown in FIG. 1B, configured to generate tasks specific to the manufacturing process as well as certifications of the manufacturing operator. In another embodiment, the plurality of modules can include a third-party sales module 121, also shown in FIG. 1B. The third-party sales module 121 can be in communication with the platform module 118 and the ERP module 114. The third-party sales module 121 can allow for a model 111 to be uploaded to the third-party sales module via the platform module 118. The third-party sales module 121 can permit customers to view models 111 available through a third-party computer. Where the customer orders a product 101 based on the model 111 from the third-party, the ERP module 114 and production module 112 can work to manufacture and deliver the product 101 to the customer.

Figure 5:
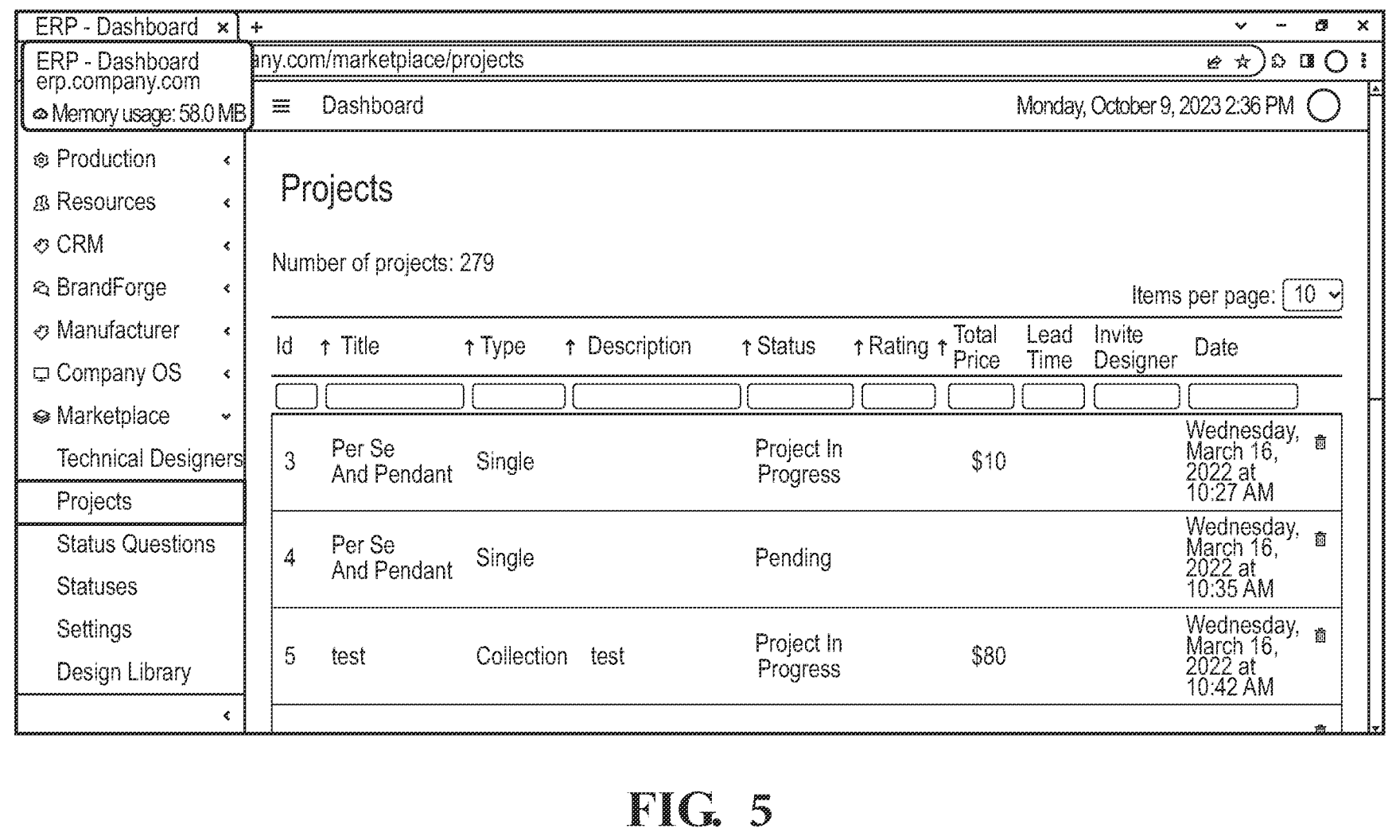

As shown in FIG. 5, the marketplace module 116 can display projects active within the ERP module 114 to provide the administrator with a real-time list of previous, processing, and pending projects. In this way, the marketplace module 116 can allow for the administrator to understand the processing capabilities of the ERP module 114.

Figure 4:
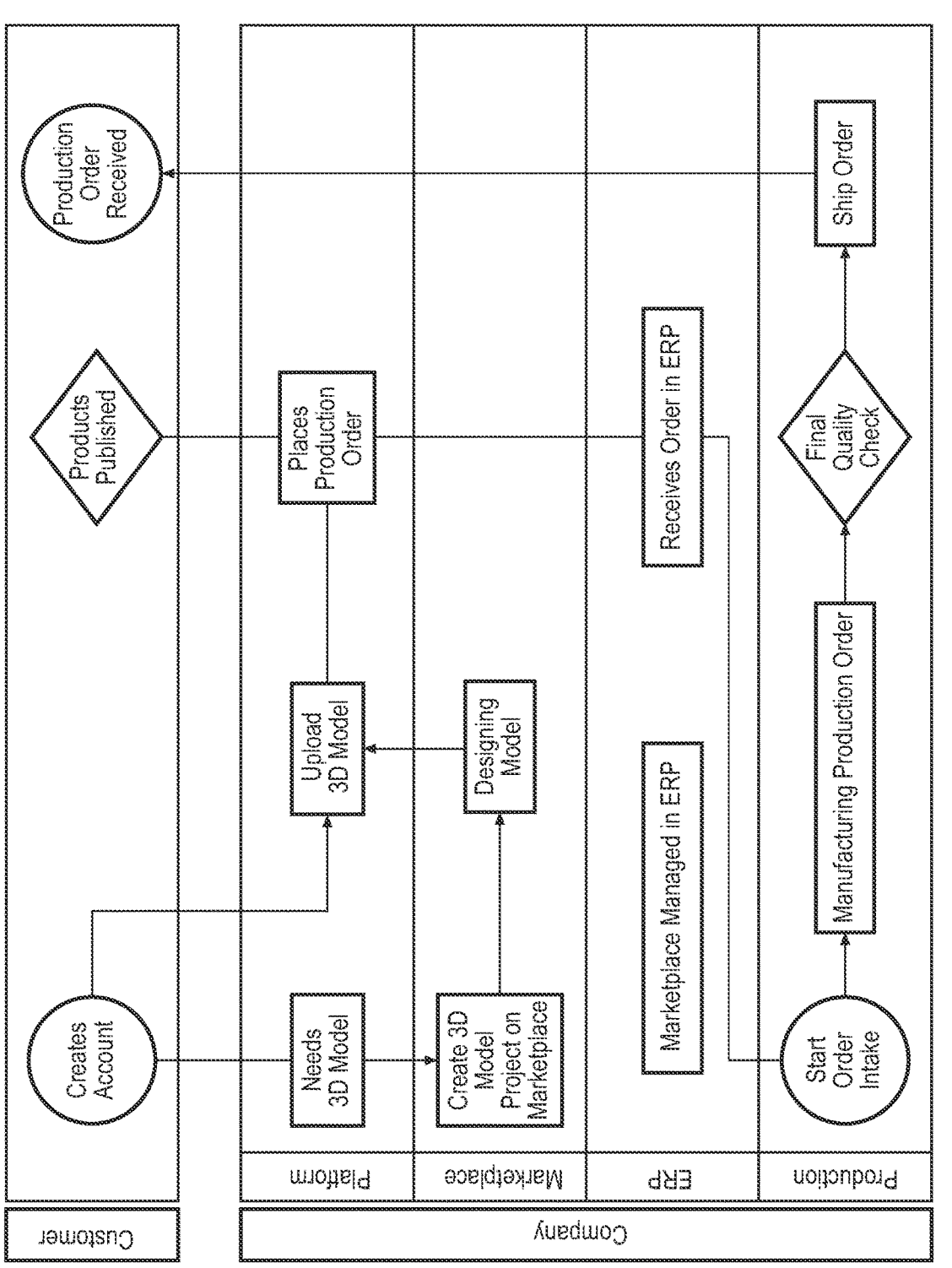
FIG. 4 is a schematic depicting an implementation of the system shown in FIG. 1A, according to one embodiment of the present disclosure.

As shown in FIG. 4, the platform module 118 can be in communication with the marketplace module 116 and the ERP module 114. The ERP module 114 can be in communication with the production module 112. The ERP module 114 can further analyze trends from the plurality of datasets to provide the administrator with trend data within a manufacturing process 174. The trend data can include, as a non-limiting example, information on which products 101 are selling successfully and which products are not selling successfully.

The ERP module 114 can be configured to generate an administrator interface 120 and a manufacturing operator interface 122. The administrator interface 120 can permit interaction with the system 100 by the administrator. Similarly, the manufacturer operator interface 122 can permit interaction with the system 100 by the manufacturing operator. The ERP module 114 can further include a plurality of databases. At least one of the plurality of databases can store manufacturing operator attributes 124, product attributes 126, quality check attributes 128, and pricing attributes 130. One skilled in the art can also select other suitable attributes to be stored in the plurality of databases within the scope of the present disclosure.

Figure 7:
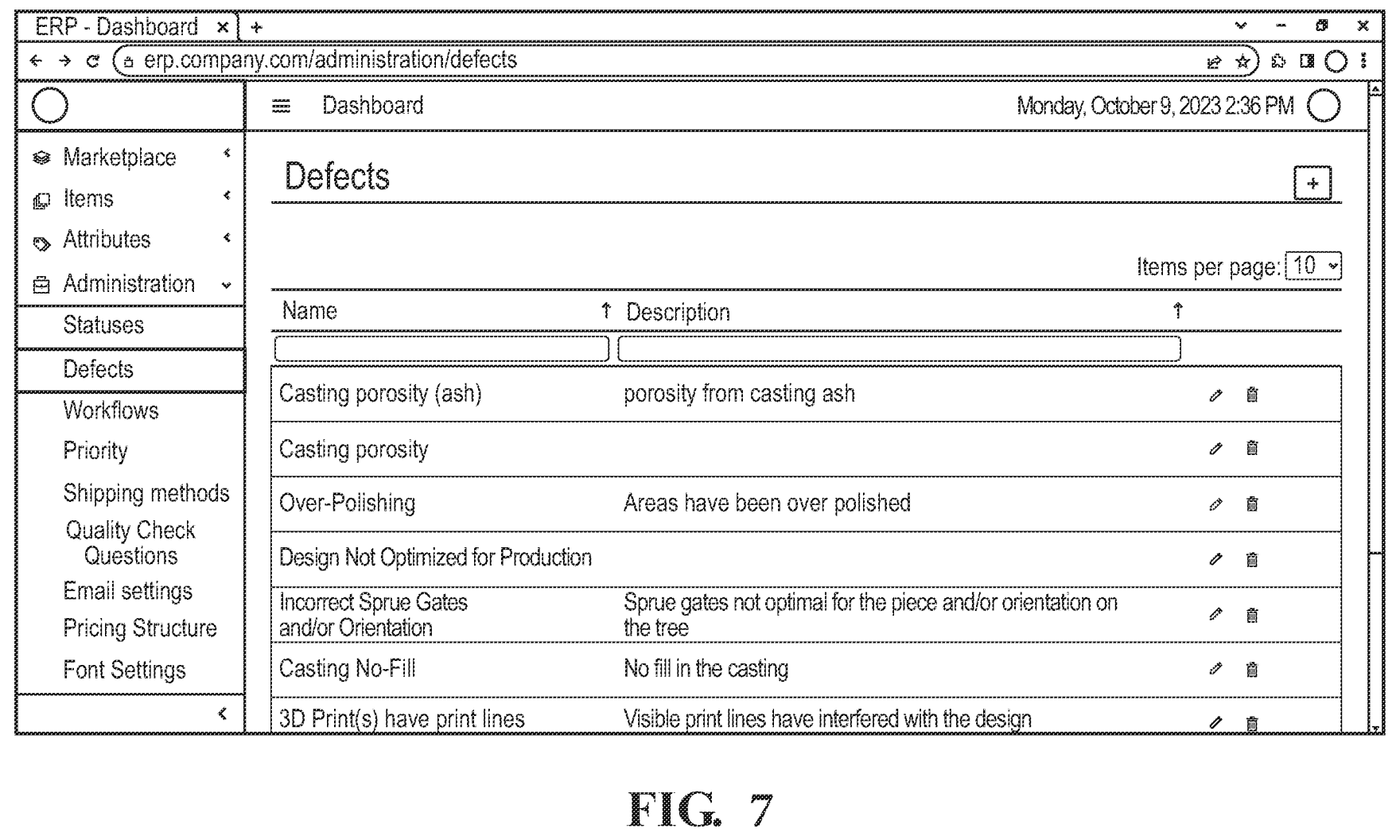

The manufacturing operator attributes 124 can include at least one of a workflow dataset 132, a defect rate dataset 134, a success rate dataset 136, and a labor dataset 138. The workflow dataset 132 can include a plurality of processing steps associated with a workflow 140 of the manufacturing operator. The defect rate dataset 134 can include data relating to a defect rate associated with the manufacturing operator and the product, as shown in FIG. 7. The success rate dataset 136 can include data relating to a success rate associated with the manufacturing operator and the product 101. The labor dataset 138 can include data relating to the cost of labor to manufacture the product based on the workflow of the manufacturing operator.

The workflow dataset 132 is a detailed stepwise specification of a workflow of the manufacturing operator and can differ from manufacturing operator to manufacturing operator based on the skill set and equipment of the manufacturing operator. The workflow dataset 132 can include at least one of a plurality of workflow steps 142. As a non-limiting example, the plurality of workflow steps 142 can include at least one of an order intake process, a 3D spuing process, a 3D printing process, a 3D printing cleaning process, a 3D printing clipping process, a 3D printing curing process, a support removing process, a 3D printing repair process, a casting process, a pre-polishing process, a repairing process, an assembling process, a hand polishing process, and engraving process, a plating process, a final assembling process, a quality checking process, a packing process, a delivering process, and a training process. The training process can allow for the ERP module 114 to supply the manufacturing operator with instructions and training relative to each status of the workflow. The training process can be a manual or human-to-human training or can be done via artificial intelligence. The workflow dataset 132 can further include a complexity variable 144 stored in the workflow dataset 132 of the ERP module 114 and associated with at least one of the plurality of processing steps in the workflow dataset 132. The complexity variable 144 can be used in determining a time duration of at least one of the plurality of processing steps.

Additionally, the workflow dataset 132 can be associated with a workflow variable 146. Similarly, the defect rate dataset 134 can be associated with a defect rate variable 148, the success rate dataset 136 can be associated with a success rate variable 150, and the labor dataset 138 can be associated with a labor variable 152. The defect rate variable 148 can be at least one of a first defect rate variable 154 associated with a plurality of products, a second defect rate variable 156 associated with the model 111 according to different workflows, and a third defect rate variable 158 associated with the workflow across all models. Each of the first defect rate variable 154, the second defect rate variable 156, and the third defect rate variable 158 can be used to determine the defect rate variable 148. One of ordinary skill in the art can select other defect rates within the scope of the present disclosure.

In certain embodiments, at least one of the workflow variables 146, the defect rate variable 148, the success rate variable 150, and the labor variable 152 can be used to determine the pricing attributes 130 using a pricing attributes algorithm. FIG. 9 depicts the multiple datasets and variables that can contribute to the pricing attributes and be used in the pricing attributes algorithm. To this point, as the workflow dataset variable 146, the defect rate variable 148, the success rate variable 150, and the labor variable 152 fluctuate based on varying factors, such as different workflows, the defect rate changing, and the price of labor increasing, and these variables are used in the pricing attributes algorithm, the pricing attributes 130 can change in real-time.

Figure 8:
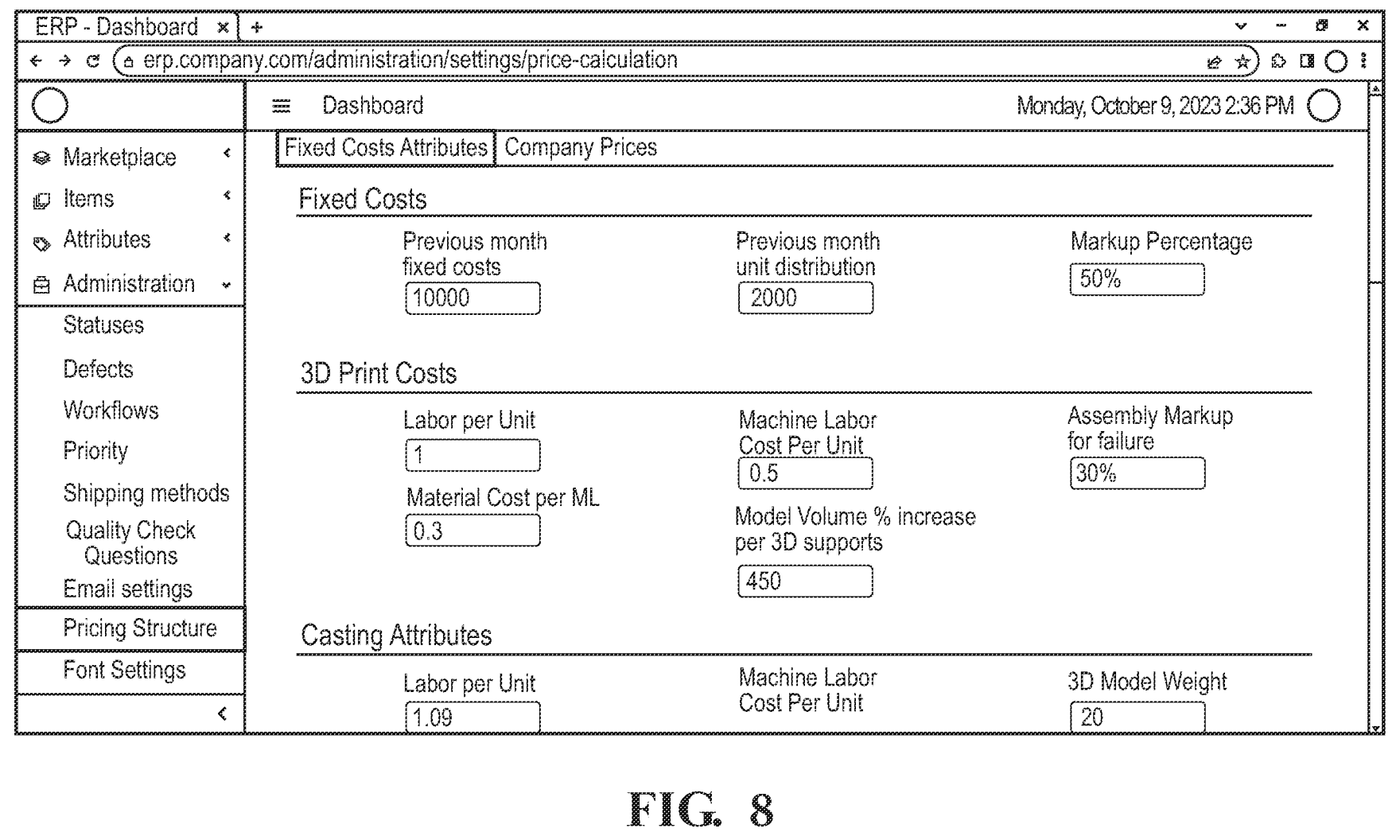

In certain embodiments, additional datasets, and therefore, additional variables can be used in the pricing attributes algorithm. As a non-limiting example, a fixed cost dataset 162 relating to a fixed cost variable 164 and associated with the fixed cost of manufacturing the product and a price increase markup dataset 166 relating to a price increase markup variable 168 and associated with a price markup chosen by the administrator, as shown in FIG. 8. The pricing attributes algorithm can calculate, in real time, the price of the product based on the above-described datasets and associated variables. In this way, the system 100 can be constantly updated with pricing data for future orders.

Figure 6:
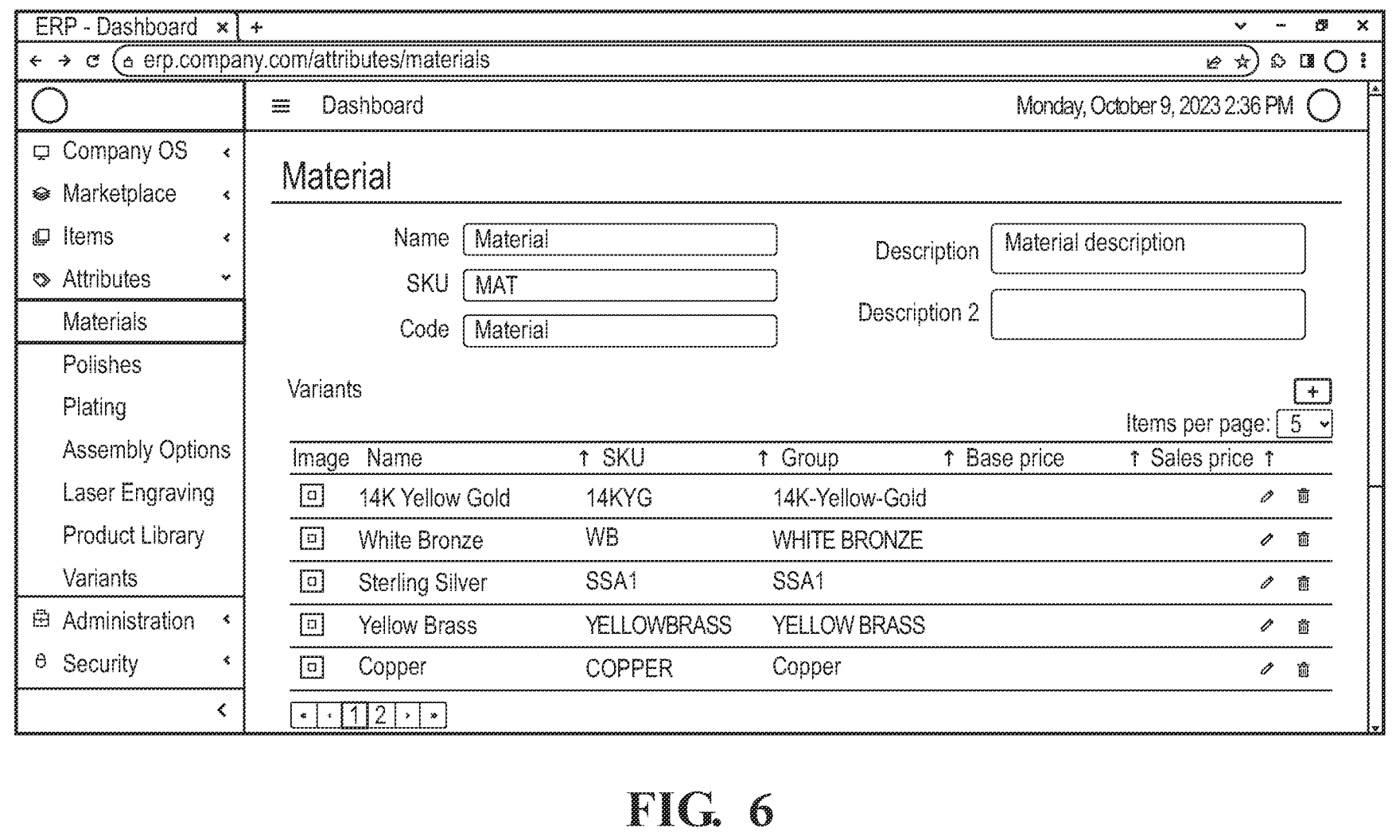

With reference to FIG. 6, the product attributes 126 can be specific to the model 111 and, as a non-limiting example, can include a material variable 167, a plating variable 168, a polishing variable 169, and an assembly variable 170. Additionally, because the product attributes 126 heavily depend on the type of product being manufactured, each variable of the product attributes 126 can be added, removed, or modified within the ERP module 114 by the administrator via the administrator interface 120 or the manufacturing operator via the manufacturing operator interface 122.

The quality check attributes 128 can be associated with a quality check. The quality check can require one of the manufacturing operator via the manufacturing operator interface 122 and the administrator via the administrator interface 120, to check the product at at least one of the plurality of processing steps against the quality check attributes 128. The quality check attributes 128 can include an image 172 having a predetermined acceptable quality. Additionally, at least one of the manufacturing operator and the administrator can verify that the product meets the quality check attributes 128.

It should be appreciated that the manufacturing operator can have a manufacturing process 174 that includes the plurality of processing steps. In such cases where there are multiple manufacturing operators, each of the manufacturing operators can have a different manufacturing process 174, and subsequently, different processing steps. To this point, each manufacturing process 174 and processing steps can be unique to the manufacturing operator. A skilled artisan can select a suitable manufacturing process 174 and processing steps depending on the type of product being manufactured and the relative capabilities of the manufacturing operator.

As a non-limiting example, and in certain embodiments, the manufacturing process 174 can include a 3D printing process and a customization process. The 3D printing process can include a 3D spruing associated with the workflow 140 of the manufacturing operator to manufacture and a 3D printing associated with the workflow 140 of the manufacturing operator to manufacture. The 3D printing process can further include clipping, cleaning, and curing the 3D print according to the model 111 and the workflow 140 of the manufacturing operator. The customization process can include a casting process, a pre-polishing process, a polishing process, an assembling process, an engraving process, and a packaging process.

It should be appreciated that the memory 110 of the at least one system 100 can further include or be coupled to a memory 110 (internal or external), which can be coupled to one or more processors such as the system processor 108, for storing information and instructions that can be executed by the system server processor. The system memory 110 can be one or more memories and of any type suitable to the local application environment and can be implemented using any suitable volatile or nonvolatile data storage technology such as a semiconductor-based memory device, a magnetic memory device and system, an optical memory device and system, fixed memory, and removable memory. For example, the system memory 110 can consist of any combination of random-access memory (RAM), read only memory (ROM), static storage such as a magnetic or optical disk, hard disk drive (HDD), or any other type of non-transitory machine or computer readable media. The instructions stored in the system server memory can include program instructions or computer program code that, when executed by the system processor 108, enable the at least one system 100 to perform tasks as described herein.

One skilled in the art will also appreciate that one or more processors 108 such as the system processor 108 of the at least one system server 102 can be configured for processing information and executing instructions or operations. The system processor 108 can be any type of general or specific purpose processor. In some cases, multiple processors for the system processor 108 can be utilized according to other embodiments. In fact, the one or more of the system processors 108 can include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. In some cases, the one or more of the system processors 108 can be remote from the at least one system 100, such as disposed within a remote platform like the one or more remote platforms of FIG. 1.

The one or more processors 108 can perform functions associated with the operation of system 100 which can include, for example, precoding of antenna gain/phase parameters, encoding and decoding of individual bits forming a communication message, formatting of information, and overall control of the one or more computing platform, including processes related to management of communication resources.

In some embodiments, one or more computing platforms can also include or be coupled to one or more antennas (not shown) for transmitting and receiving signals and/or data to and from the at least one system 100. The one or more antennas can be configured to communicate via, for example, a plurality of radio interfaces that can be coupled to the one or more antennas. The radio interfaces can correspond to a plurality of radio access technologies including one or more of LTE, 5G, WLAN, Bluetooth, near field communication (NFC), radio frequency identifier (RFID), ultrawideband (UWB), and the like. The radio interface can include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

With renewed reference to FIGS. 1A-1C, and as described hereinabove, the memory 110 stores the plurality of modules, including the production module 112, the ERP module 114, the marketplace module 116, and the platform module 118, and including the machine-readable instructions, which can be provided as tangible, non-transitory processor executable instructions, as a non-limiting example. The instructions are configured to execute the method 200 of the present disclosure, by the processor 108 or the other processors of the system 100 as detailed herein, and as described hereinbelow and shown in FIGS. 2A-2C and 3A-3K.

Referring now to FIGS. 2A-2C and 3A-3K, the method 200 of the present disclosure can include a first step 202 of providing the system 100 as described hereinabove. In operation, the method 200 includes a second step 204 of permitting the customer, by using the platform module 118, to one of supply a model 111 of the product to the ERP module 114 and request the model 111 of the product from a third-party designer. The third-party designer can have access to the marketplace module 116 so that the third-party designer can supply the model 111 of the product 101 to the ERP module 114. The customer can work with the third-party designer to offer initial ideas and suggestions for the model 111.

In certain embodiments, the ERP module 114 can further include a model generator configured to generate the model 111 of the product 101 based on a search entry entered by the customer to the platform module 118 on the customer computer 103. The method 200 can include a third step 206 of requesting the model 111 of the product 101 from a model generator with access to the marketplace module 116, so that the model generator will supply the model 111 of the product 101 to the ERP module 114. As a non-limiting example, the model generator can include a model generator artificial intelligence application stored on the ERP module 114.

A fourth step 208 of the method 200 includes selecting, by the customer with the platform module 118 via the customer computer 103, the product attributes 126 to customize the product 101. The method includes a fifth step 210 of matching, by the ERP module 114, the product attributes 126 associated with the model 111 and the manufacturing operator attributes 124 of the manufacturing operator. In this way, the product attributes 126 allow the manufacturing operator to manufacture the model 111 selected by the customer.

A sixth step 212 of the method 200 includes permitting the customer to view the manufacturing operator attributes 124 and the product attributes 126. The customer can use the ERP module 114 to view the manufacturing operator attributes 124 and the product attributes 126. As described above, the manufacturing operator attributes 124 can include at least one of a workflow dataset 132, a defect rate dataset 134, a success rate dataset 136, and a labor dataset 138. As one non-limiting example, the product attributes 126 can be specific to each model 111 and can include material options, plating options, polishing options, and assembly options. Additionally, because the product attributes 126 heavily depend on the type of product 101 being manufactured, the product attributes 126 can be added, removed, or modified within the ERP module 114 by the administrator via the administrator interface 120 or the manufacturing operator via the manufacturing operator interface 122. Advantageously, the administrator, the manufacturing operator, and the customer can easily add new customizations for the product 101 as they become available due the to easily modified nature of the ERP module 114. Upon viewing the manufacturing operator attributes 124 and the product attributes 126, the customer can select the manufacturing operator based on the manufacturing operator attributes 124, the product attributes 126, and the pricing attributes 130.

In operation, the method 200 includes a seventh step 214 of assigning to the manufacturing operator selected by the customer the model 111 of the product 101 to be manufactured by the manufacturing process. This can be done via the ERP module 114. The method 200 includes an eighth step 216 of beginning a manufacturing of the product 101, by the manufacturing operator, based on the model 111 of the product 101, the manufacturing process, and the product attributes 126. As described above, the product 101 is manufactured based on the model 111, the manufacturing process specific to the manufacturing operator that the customer selected, and the product attributes 126 that the customer selected.

It should be appreciated that, in certain embodiments, the method 200 can include a ninth step 218 of associating, from the manufacturing operator by the manufacturing operator interface 122, a complexity variable stored in the workflow dataset of the ERP module 114. The complexity variable is associated with at least one of the plurality of processing steps in the workflow dataset. Advantageously, the complexity variable can be used to determine a time duration of at least one of the plurality of processing steps and allow for the manufacturing operator to predict production time. The estimated production time can be communicated to the client to adequately manage client expectations.

It should be noted that the manufacturing process can further include a 3D printing process and a customization process. The 3D printing process can include a tenth step 220 of completing a 3D spruing associated with the workflow 140 of the manufacturing operator to manufacture a 3D sprue associated with the model 111 and an eleventh step 222 of completing a 3D printing associated with the workflow 140 of the manufacturing operator to manufacture a 3D print associated with the model 111. Upon completion of the 3D printing step, the 3D model 111 can be manufactured. The 3D printing process can further include a twelfth step 224 of clipping the 3D print according to the model 111 and workflow 140 of the manufacturing operator, a thirteenth step 226 of cleaning the 3D print according to the model 111 and workflow 140 of the manufacturing operator, and a fourteenth step 228 of curing the 3D print according to the model 111 and workflow 140 of the manufacturing operator.

As stated above, the manufacturing process can also include a customization process. The customization process can include at least one of the casting process, the pre-polishing process, the polishing process, the assembling process, the engraving process, and the packaging process, as associated with the workflow dataset. A fifteenth step 230 of the method, the casting process, can include casting the product 101 based on the model 111, the product attributes 126, and the workflow 140 of the manufacturing operator. A sixteenth step 232 of the method, the pre-polishing process, can include pre-polishing the product 101 based on the product attributes 126 and the workflow 140 of the manufacturing operator. A seventeenth step 234 of the method, the polishing process, can include polishing the product 101 based on the product attributes 126 and the workflow 140 of the manufacturing operator. An eighteenth step 236 of the method, the assembling process, can include assembling the product 101 based on the product attributes 126 and the workflow 140 of the manufacturing operator. A nineteenth step 238 of the method, the engraving process, can include engraving the product 101 based on the product attributes 126 and the workflow 140 of the manufacturing operator. A twentieth step 240 of the method 200, the packaging process, can include packaging the product 101 for delivery to the customer.

A twenty-first step 242 of the method includes generating a quick release (QR) code using the ERP module 114 and a twenty-second step 244 of assigning the QR code to the product 101 during the manufacturing process, by the manufacturing operator, to identify the product 101 throughout the plurality of processing steps. A twenty-third step 246 includes associating the QR code and the product 101 in the ERP module 114, a twenty-fourth step 248 of printing a label with code, a twenty-fifth step 250 of affixing the label with code to product 101, and a twenty-sixth step 252 of providing a scanner. The method provides a twenty-seventh step 254 of scanning the QR code of the product 101 with the scanner in at least one of the plurality of processing steps of the manufacturing process to generate the status associated with a location of the product 101 in the process and a twenty-eighth step 256 of transmitting the status from the scanner to the ERP module 114. A twenty-ninth step 258 of the method includes permitting at least one of the manufacturing operator, by the manufacturing operator interface 122, and the administrator, by the administrator interface 120, to view the location of the product 101 in the process. In this way, the QR code can allow for the product 101 to be tracked in real-time during the manufacturing process.

A thirtieth step 260 of the method 200 includes determining, by the ERP module 114, the image 172 having a predetermined acceptable quality associated with at least one of the plurality of processing steps. For this purpose, the ERP module 114 can select the image 172 from a predetermined catalog of images having a predetermined acceptable quality.

A thirty-first step 262 of the method includes permitting the administrator, by the administrator interface 120 of the ERP module 114, to monitor a status of at least one of the plurality of processing steps of the manufacturing process in real-time. The status can associate the product 101 as it is being manufactured with the workflow 140 of the manufacturing operator, and therefore, with at least one of the processing steps of the manufacturing process. As a non-limiting example, where the product 101 is in the polishing process, the ERP module 114 can track the status of the product 101 within the polishing step, i.e., the product 101 is waiting for the polishing process to begin, the product 101 is in an intermediate polishing step, and the product 101 is awaiting a polishing process quality check. The status within at least one of the plurality of processing steps can allow for the administrator to know which steps have been completed and which steps remain within at least one of the plurality of processing steps and therefore processes. In certain embodiments, monitoring of the status can be done in real time. Advantageously, this can permit the administrator to know the exact location of the product 101 at any moment during the manufacturing process allowing for real-time updates to the customer and the ability to provide expected shipment dates more accurately.

A thirty-second step 264 of the method 200 includes permitting the manufacturing operator, by the manufacturing operator interface 122 of the ERP module 114, to complete a quality check of at least one of the plurality of processing steps of the manufacturing process for the product 101. Advantageously, requiring a quality check at certain processing steps increases the quality of the overall product 101 and saves manufacturing time by allowing mistakes to be caught early in the manufacturing process as opposed to at the end of manufacturing during a final quality check.

A thirty-third step 266 of the method includes obtaining, by the manufacturing operator using an image capture device, an acquired image of the product 101 at one of the plurality of processing steps and a thirty-fourth step 268 of placing, by the manufacturing operator, the image capture device in communication with the manufacturing operator interface 122. The method further includes a thirty-fifth step 270 of transferring, by the manufacturing operator, the acquired image from the image capture device to the manufacturing operator interface 122 and a thirty-sixth step 272 of transmitting, by the manufacturing operator, the acquired image from the manufacturing operator interface 122 to the ERP module 114. As such, the quality check can take place.

Figure 3A:
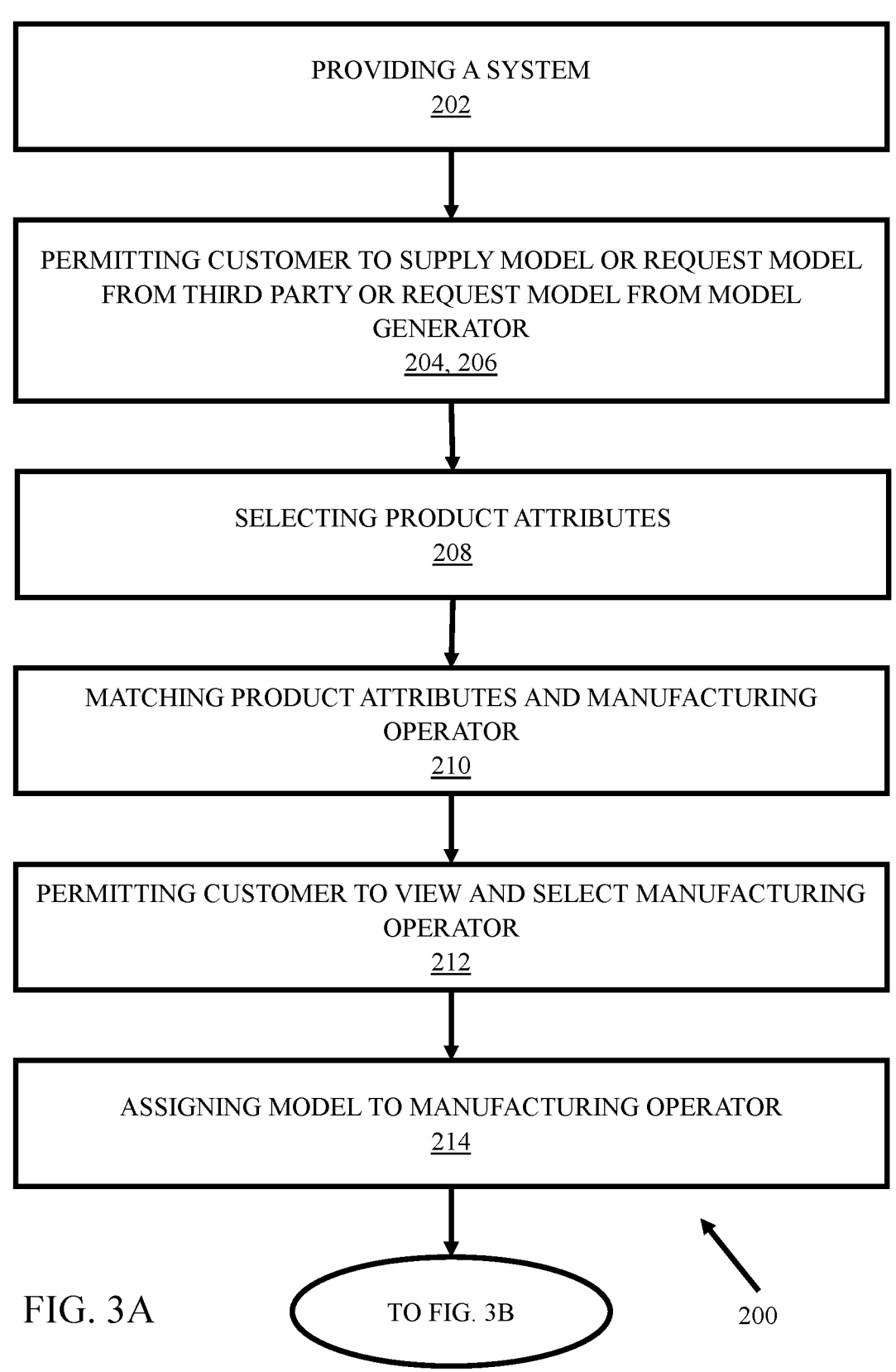
Figure 3B:
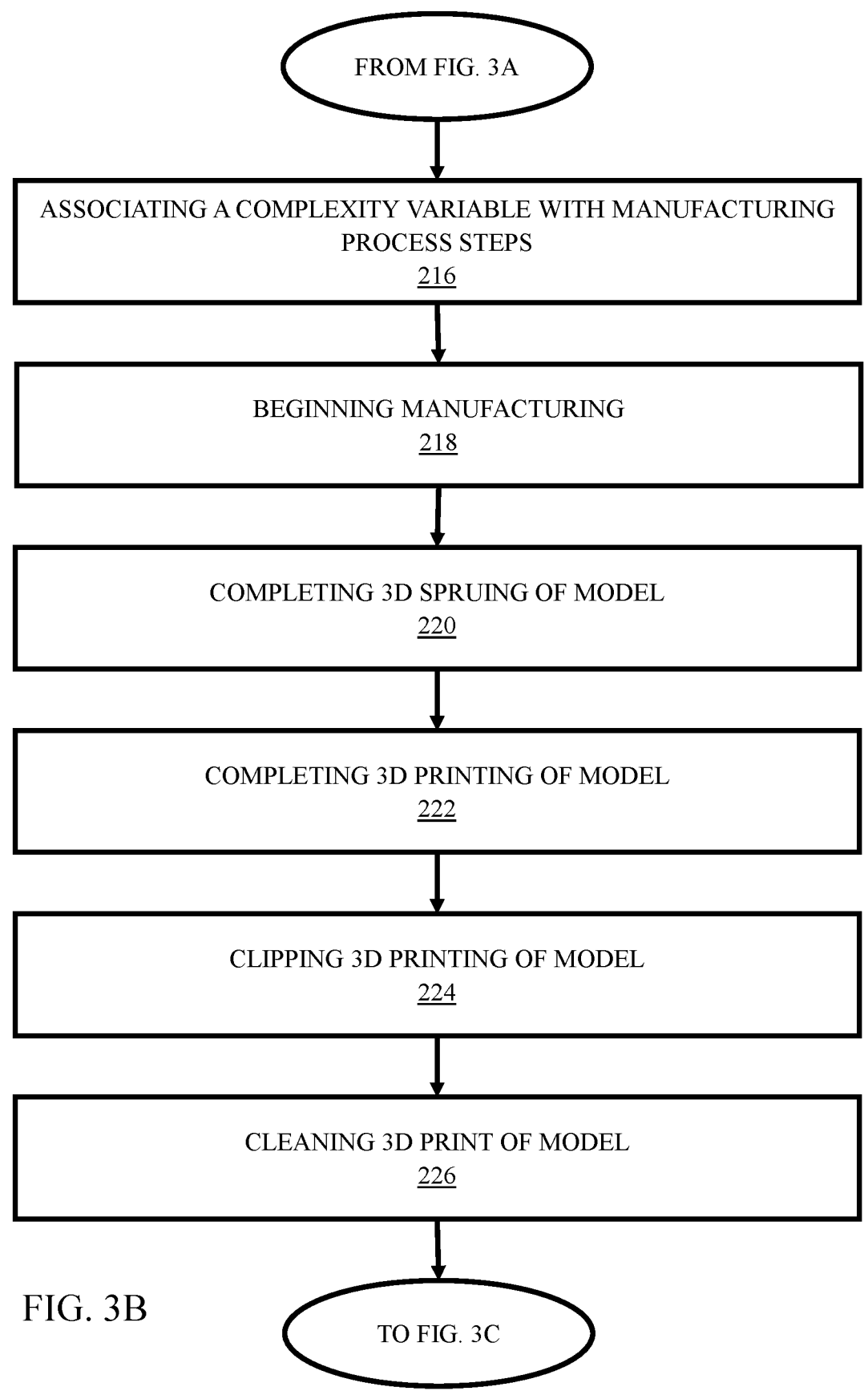
Figure 3C:
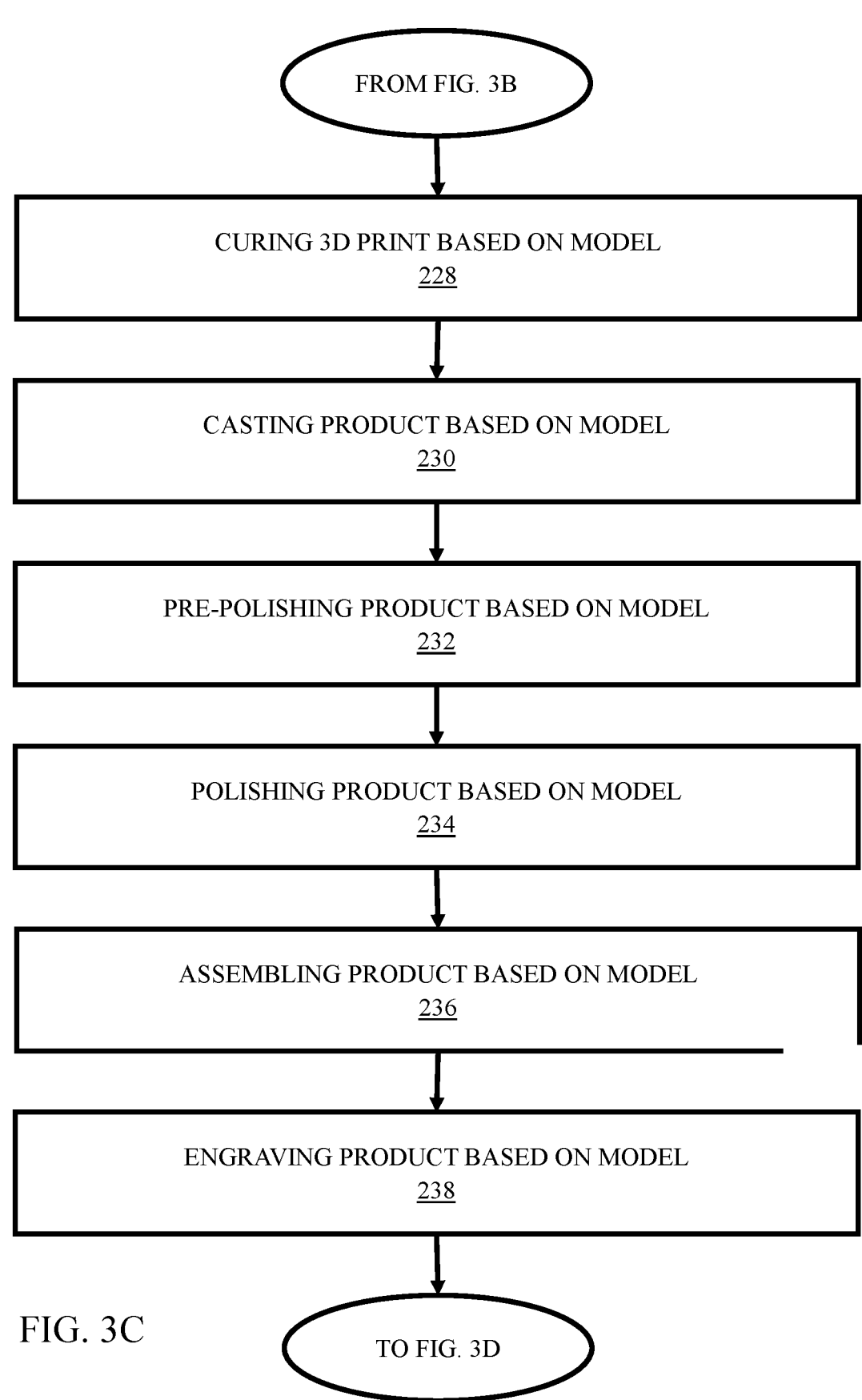
Figure 3D:
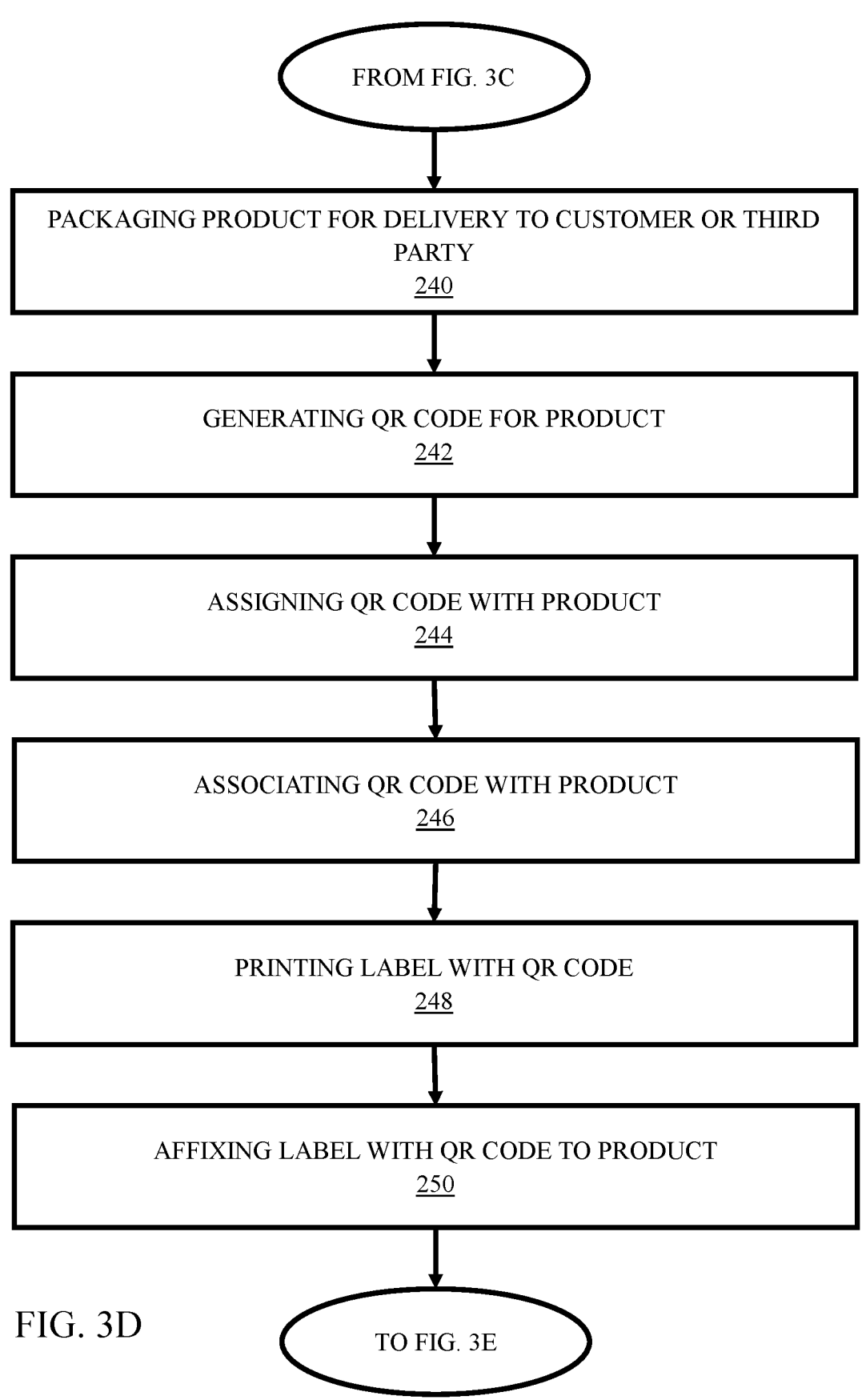
Figure 3E:
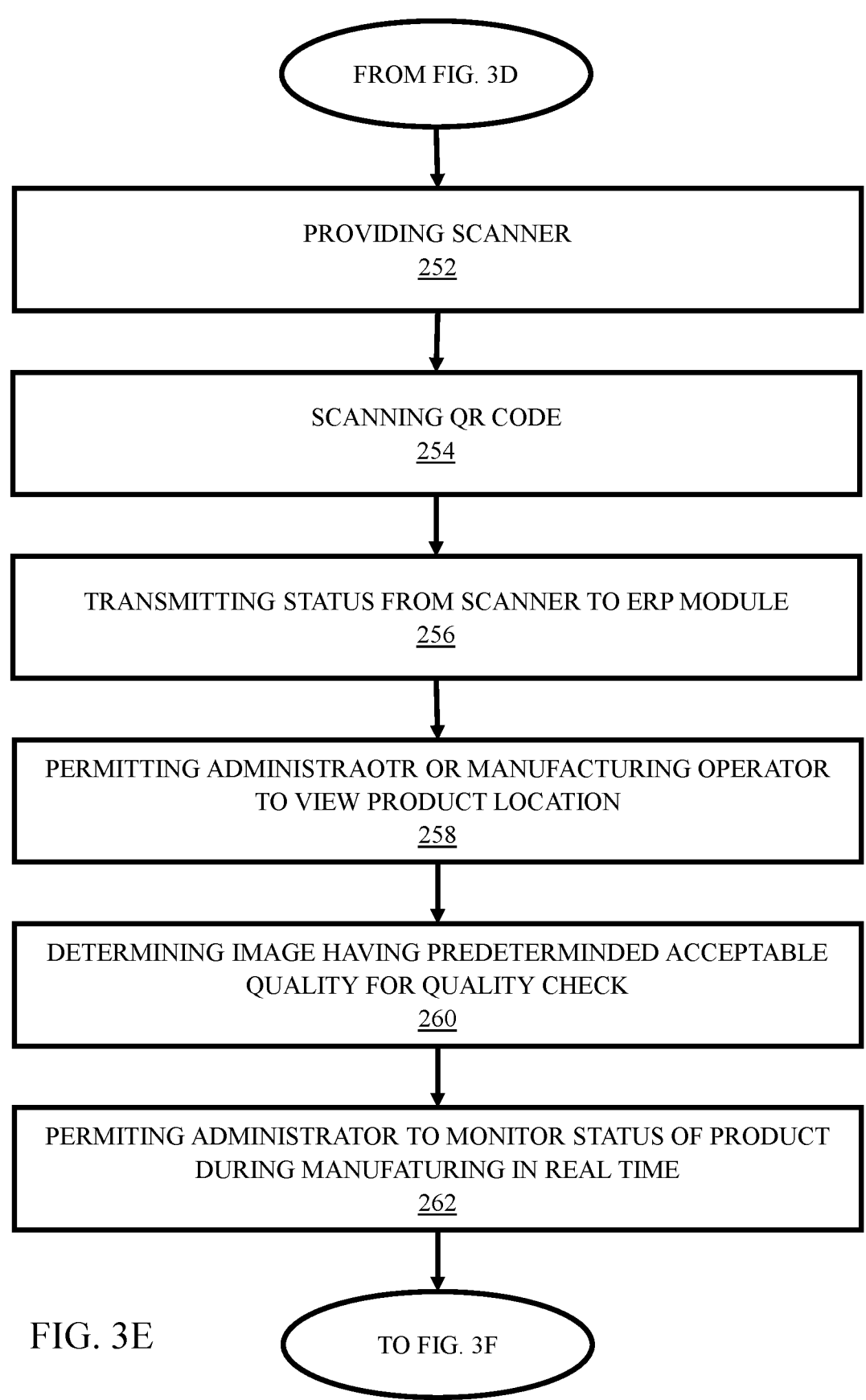
Figure 3F:
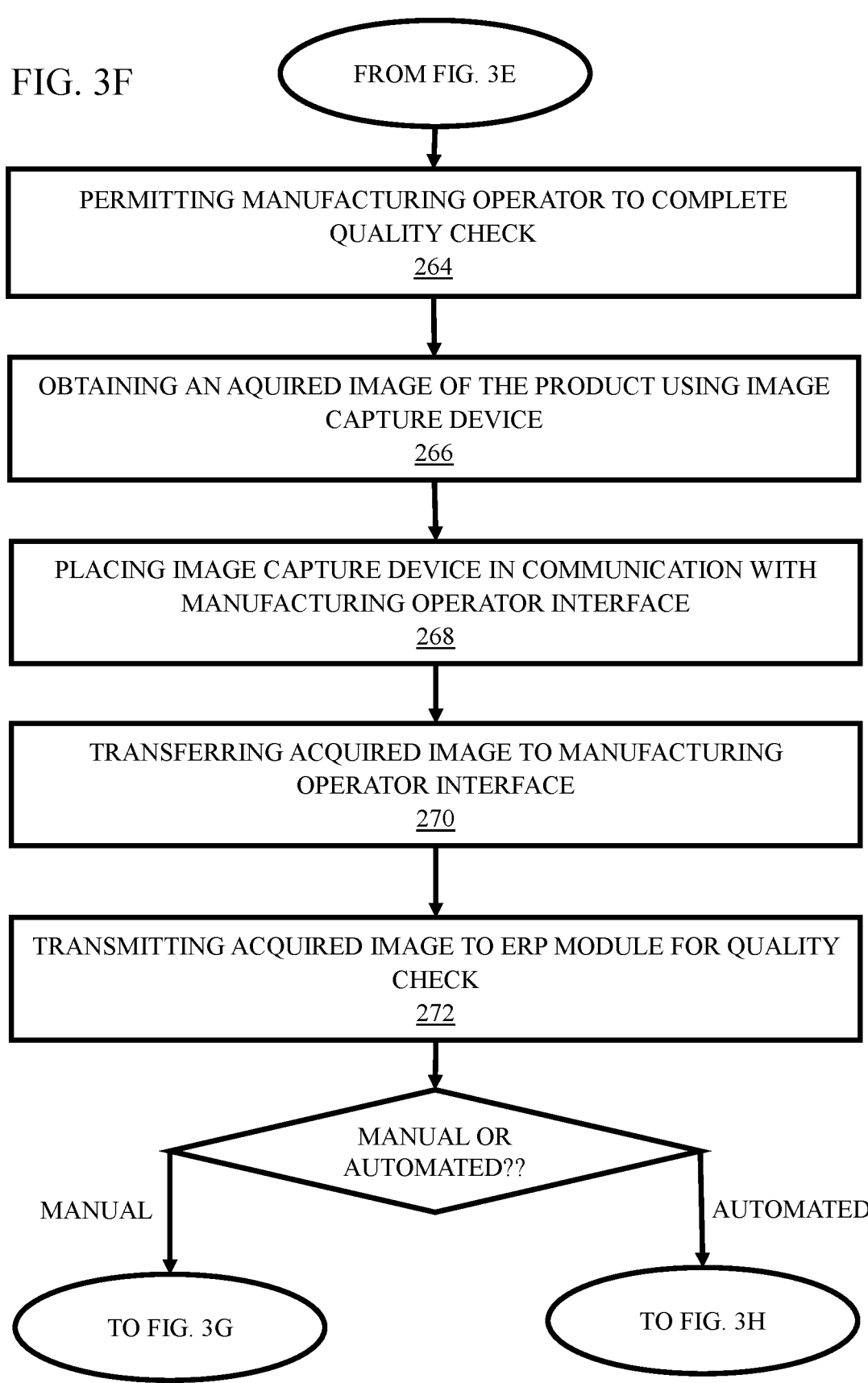
Figure 3G:
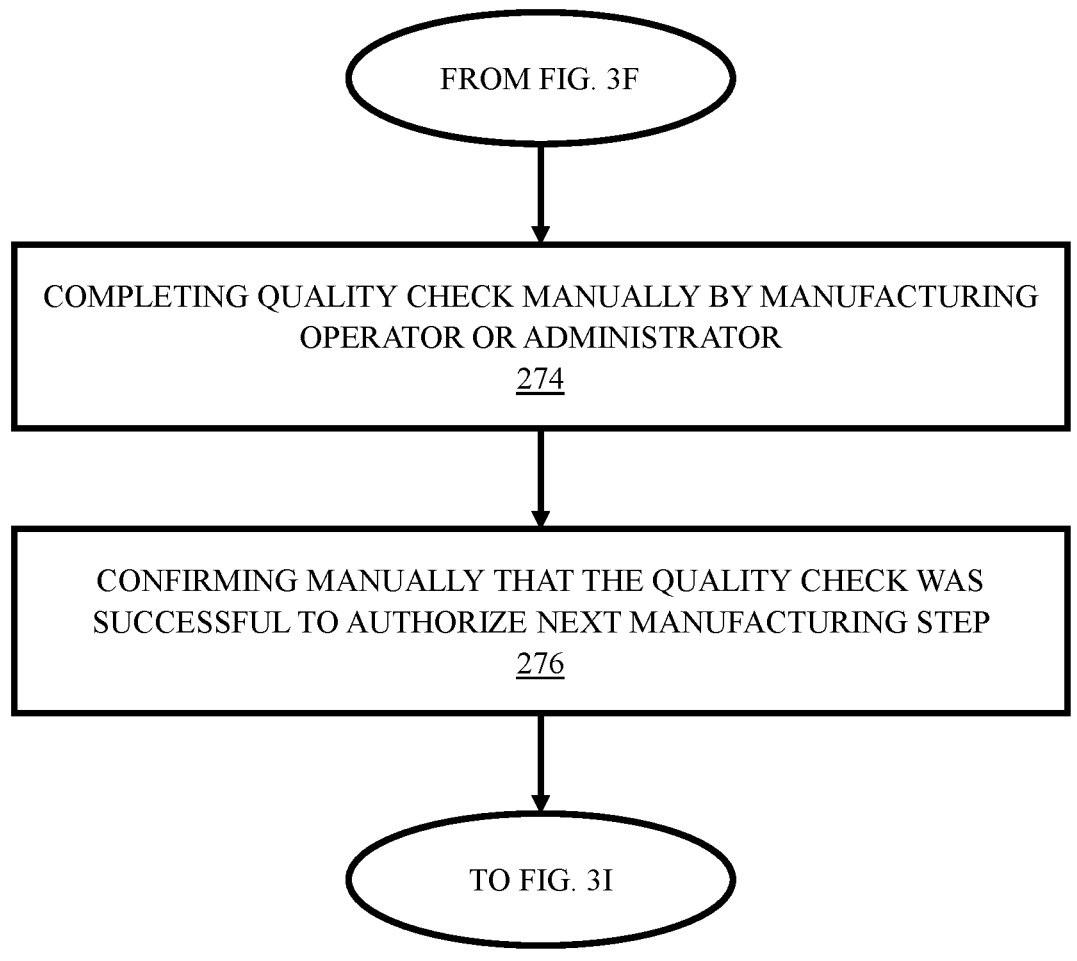
Figure 3J:
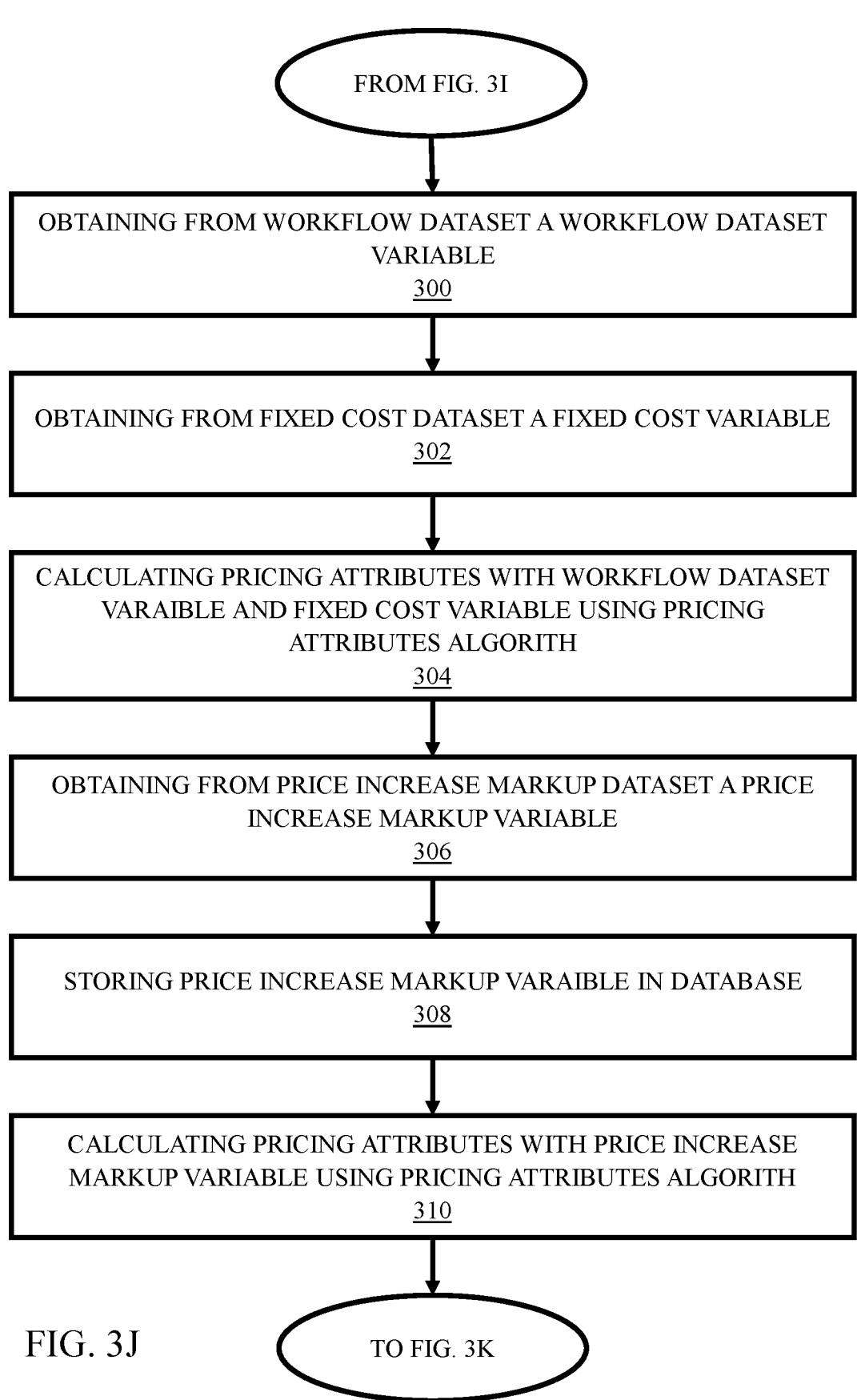
Figure 3K:
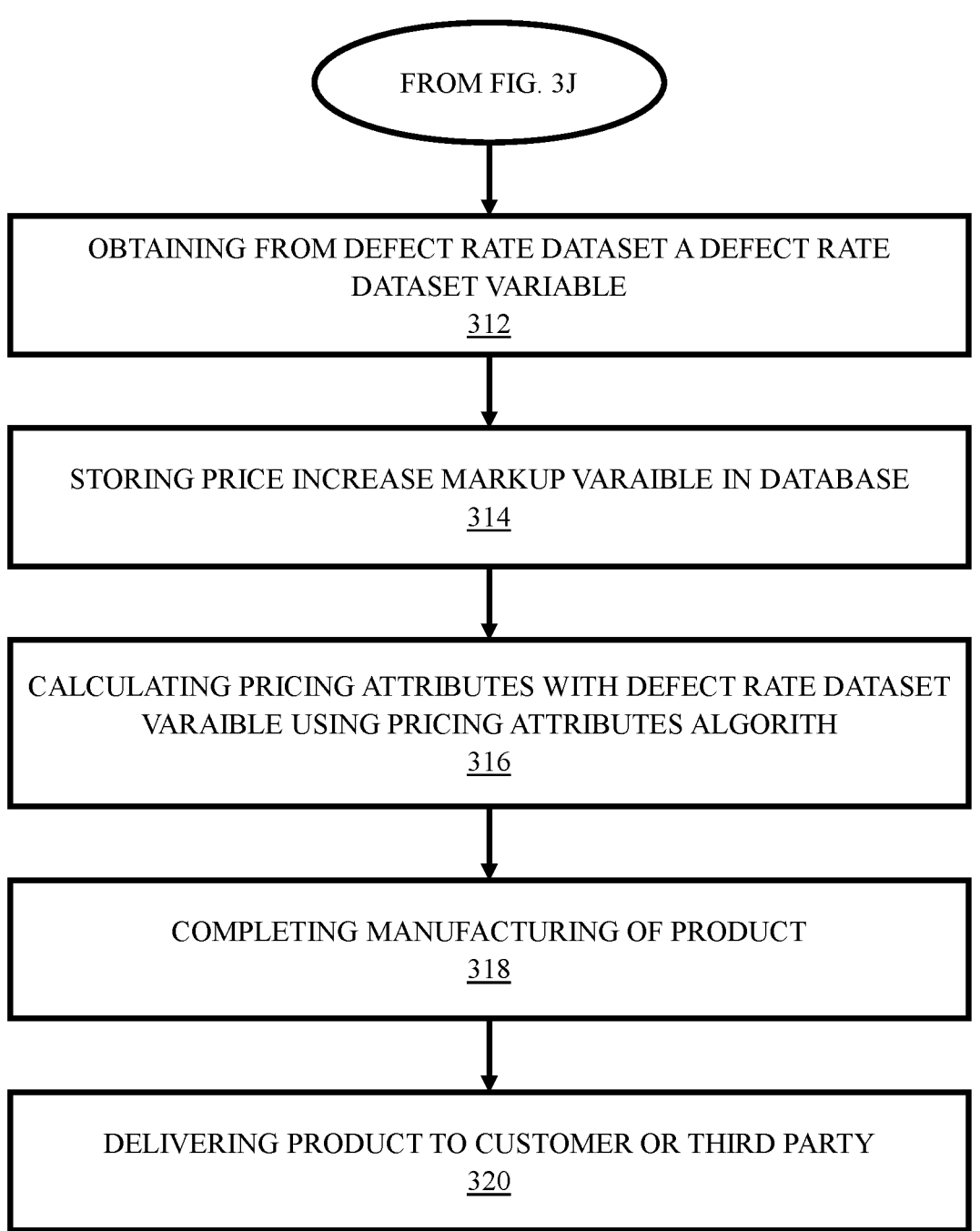
Figure 10:
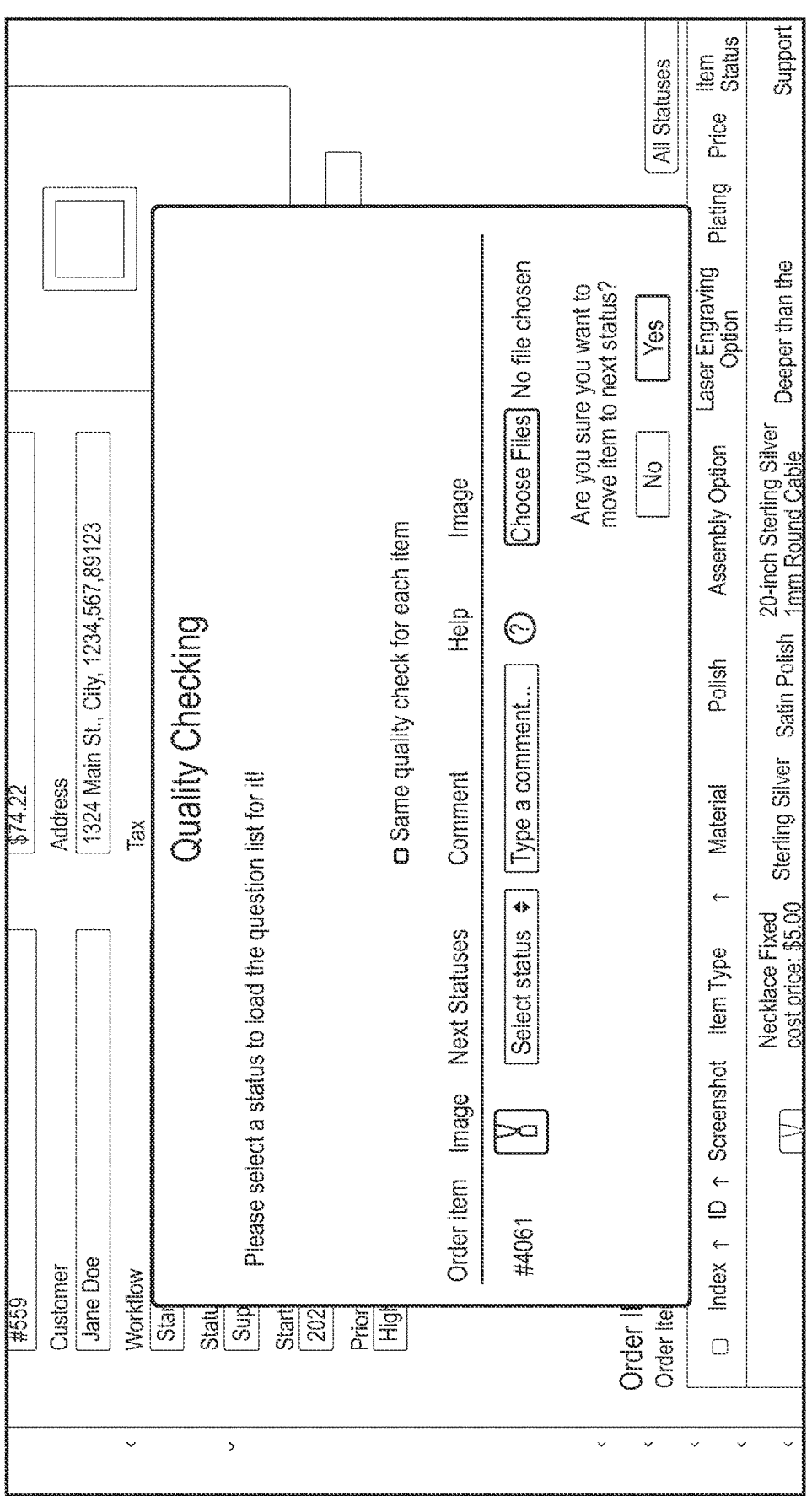
FIG. 10 is an illustration of a user interface for depicting a quality check of the ERP module on a manufacturing operator interface of the implementation shown in FIG. 4.
Figure 11:
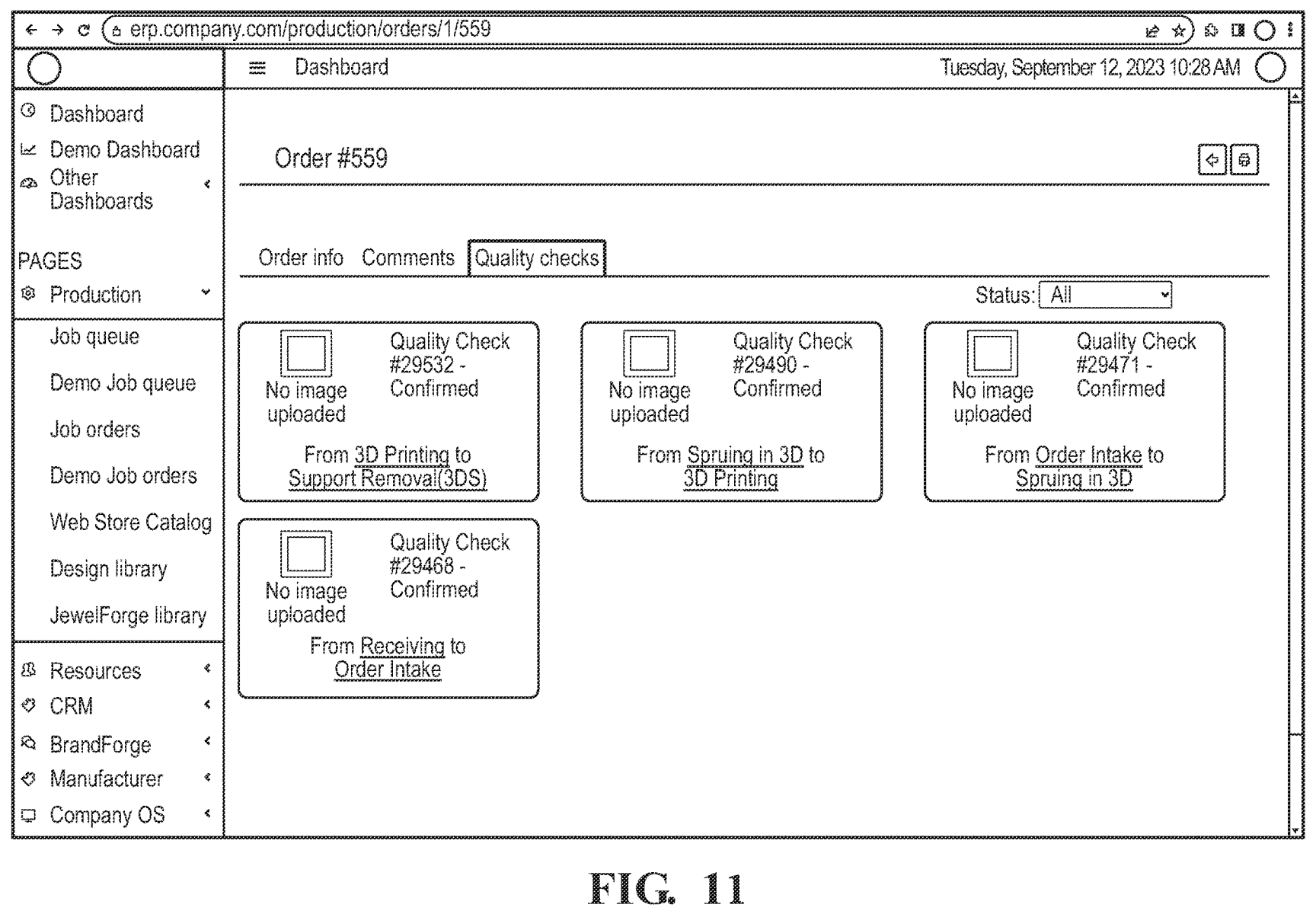

In certain embodiments, as shown in FIG. 3G, a thirty-seventh step 274 of the method includes completing the quality check manually, by at least one of the manufacturing operator via the manufacturing operator interface 122 and the administrator by the administrator interface 120, for at least one of the plurality of processing steps of the manufacturing process for the product 101, as shown in FIGS. 10-11. The confirming by either the manufacturing operator or the administrator can be done by a manual check of a check box generated within either of the manufacturing operator interface 122 or the administrator interface 120, respectively.

The thirty-seventh step 274 can further include a thirty-eighth step 276 of confirming manually, by the manufacturing operator interacting with the manufacturing operator interface 122, that the quality check has been successful to authorize the manufacturing operator to proceed to a next processing step in the plurality of processing steps of the manufacturing process for the product 101.

Alternatively to the thirty-seventh step 274, and as shown in FIG. 3H, the method 200 can include a thirty-ninth step 278 of completing the quality check automatically, by an artificial intelligence application of the ERP module 114, for at least one of the plurality of processing steps of the manufacturing process for the product 101. As such, a fortieth step 280 of the method includes confirming automatically, by the artificial intelligence application, that the quality check has been successful to authorize the manufacturing operator to proceed to a next processing step in the plurality of processing steps of the manufacturing process for the product 101.

It should be appreciated that the step of the artificial intelligence application of the ERP module 114 can automatically confirm the quality check can further include a forty-fourth step 288 of pixelating the acquired image, by the ERP module 114, whereby the acquired image includes a plurality of acquired image pixels and a forty-fifth step 290 of pixelating the quality check image supplied by the ERP module 114, whereby the quality check image includes a plurality of quality check image pixels. The confirming step can further include a forty-sixth step 292 of comparing, by the artificial intelligence, the plurality of quality check image pixels to the plurality of acquired image pixels, Each one of the plurality of quality check image pixels can correspond to one of the plurality of acquired image pixels and a forty-seventh step 294 of calculating, by the ERP module 114, if enough of the plurality of quality check image pixels and the plurality of acquired image pixels match to meet the quality check threshold.

It should be appreciated that the fortieth step 280 of the artificial intelligence application of the ERP module 114 can automatically confirm the quality check can further include a forty-first step 282 of pixelating the acquired image, by the ERP module 114, whereby the acquired image includes a plurality of acquired image pixels and a forty-second step 284 of pixelating the quality check image supplied by the ERP module 114, whereby the quality check image includes a plurality of quality check image pixels. The confirming step can further include a forty-third step 286 of comparing, by the artificial intelligence, the plurality of quality check image pixels to the plurality of acquired image pixels. Each one of the plurality of quality check image pixels can correspond to one of the plurality of acquired image pixels. The method 200 can include a forty-fourth step 288 of calculating, by the ERP module 114, if enough of the plurality of quality check image pixels and the plurality of acquired image pixels match to meet the quality check threshold.

A forty-fifth step 290 of the method 200 includes verifying by at least one of the manufacturing operator and the administrator, by at least one of the manufacturing operator interface 122 and the administrator interface 120, that the quality check attributes 128 associated with the quality check satisfy a predetermined quality check threshold.

A forty-sixth step 292 of the method 200 includes generating, by the ERP module 114, the quality check attributes 128 associated with the quality check of at least one of the plurality of processing steps of the manufacturing process for the product 101 where the quality check does satisfy the predetermined quality check threshold.

Alternatively to the forty-sixth step 292, and as shown in FIG. 3I, where the quality check is not satisfied, the method includes a forty-seventh step 284 of requiring, by the ERP module 114, that one of the plurality of processing steps associated with the quality check be repeated where the quality check does not satisfy the predetermined quality check threshold.

The method 200 includes a forty-eighth step 296 of permitting the manufacturing operator, by the manufacturing operator interface 122, to communicate the quality check attributes 128 associated with the quality check of at least one of the plurality of processing steps to the plurality of databases.

In operation, a forty-ninth step 298 of the method 200 includes calculating, by the ERP module 114, the pricing attributes 130 associated with the manufacturing operator based on a pricing attributes algorithm, the pricing attributes algorithm including at least the quality check attributes 128 stored on the plurality of databases and associated with the manufacturing operator. In certain embodiments, the workflow variable 146 and the fixed cost variable 164 can be used in the pricing attributes algorithm. As such, the method can further include a fiftieth step 300 of obtaining from the workflow dataset, by the manufacturing operator interface 122, a set of workflow variables. The method can also include a fifty-first step 302 of obtaining from the fixed cost dataset, by the administrator interface 120, a fixed cost variable 164. A fifty-second step 304 of the method 200 can include calculating, by a pricing attributes 130 calculation in the ERP module 114, the pricing attributes 130 by processing the set of workflow variables and the fixed cost variable 164 with the pricing attributes algorithm.

In a further embodiment, the method can include a fifty-third step 306 of obtaining from the administrator, by the administrator interface 120, a price increase markup variable 168 and a fifty-fourth step 308 of storing on the at least one of the plurality of databases of the ERP module 114 the price increase markup variable 168. A fifty-fifth step 310 of the method can include calculating, by the ERP module 114, the pricing attributes 130 by processing the price increase markup variable 168 in addition to the set of workflow variables and the fixed cost variable 164 with the pricing attributes algorithm.

In another embodiment, the method can include a fifty-sixth step 312 of obtaining from the defect rate dataset 134, by the manufacturing operator interface 122, a defect rate variable 148 and a fifty-seventh step 314 of storing on the at least one of the plurality of databases of the ERP module 114 the defect rate variable. A fifty-eighth step 316 of the method can include calculating, by the ERP module 114, the pricing attributes 130 by processing the defect rate variable 148 in addition to the addition to the set of workflow variables, the fixed cost variable 164, and the price increase markup variable 168 with the pricing attributes algorithm.

A fifty-ninth step 318 of the method includes completing the manufacturing of the product 101 by the manufacturer operator. The method 200 includes a sixtieth step 320 of delivering the product 101 from the manufacturing operator to the customer or a third party.

EXAMPLES

An exemplary embodiment of a method is described below, where the product 101 being manufactured is a piece of jewelry.

In a particular example, the method 200 of the present disclosure can include a first step 202 of providing the system 100 as described hereinabove. In operation, the method 200 includes a second step 204 of permitting the customer, by using the platform module 118, to one of supply a model 111 of the product to the ERP module 114 and request the model 111 of the product from a third-party designer. The third-party designer can have access to the marketplace module 116 so that the third-party designer can supply the model 111 of the piece of jewelry to the ERP module 114. The customer can work with the third-party designer to offer initial ideas and suggestions for the model 111.

In certain embodiments, the ERP module 114 can further include a model generator configured to generate the model 111 of the piece of jewelry based on a search entry entered by the customer to the platform module 118. The method 200 can include a third step 206 of requesting the model 111 of the piece of jewelry from a model generator with access to the marketplace module 116, so that the model generator will supply the model 111 of the piece of jewelry to the ERP module 114. As a non-limiting example, the model generator can include a model generator artificial intelligence application stored on the ERP module 114.

A fourth step 208 of the method 200 includes selecting, by the customer with the platform module 118, the product attributes 126 to customize the piece of jewelry. The method includes a fifth step 210 of matching, by the ERP module 114, the product attributes 126 associated with the model 111 and the manufacturing operator attributes 124 of the manufacturing operator. In this way, the product attributes 126 allow the manufacturing operator to manufacture the model 111 selected by the customer.

A sixth step 212 of the method 200 includes permitting the customer to view the manufacturing operator attributes 124 and the product attributes 126. The customer can use the ERP module 114 to view the manufacturing operator attributes 124 and the product attributes 126. As described above, the manufacturing operator attributes 124 can include at least one of a workflow dataset 132, a defect rate dataset 134, a success rate dataset 136, and a labor dataset 138. As one non-limiting example, the product attributes 126 can be specific to each model 111 and can include material, plating, polish, and assembly options. Additionally, because the product attributes 126 heavily depend on the type of piece of jewelry being manufactured, the product attributes 126 can be added, removed, or modified within the ERP module 114 by the administrator via the administrator interface 120 or the manufacturing operator via the manufacturing operator interface 122. Advantageously, the administrator, the manufacturing operator, and the customer to easily add new customizations for the piece of jewelry as they become available. Upon viewing the manufacturing operator attributes 124 and the product attributes 126, the customer can select the manufacturing operator based on the manufacturing operator attributes 124, the product attributes 126, and the pricing attributes 130.

In operation, the method 200 includes a seventh step 214 of assigning to the manufacturing operator selected by the customer, by the ERP module 114, the model 111 of the piece of jewelry to be manufactured by the manufacturing process and an eighth step 216 of beginning a manufacturing of the piece of jewelry, by the manufacturing operator, based on the model 111 of the piece of jewelry, the manufacturing process, and the product attributes 126.

It should be appreciated that, in certain embodiments, the method 200 can include a ninth step 218 of associating, from the manufacturing operator by the manufacturing operator interface 122, a complexity variable stored in the workflow dataset of the ERP module 114. The complexity variable is associated with at least one of the plurality of processing steps in the workflow dataset. Advantageously, the complexity variable can be used to determine a time duration of at least one of the plurality of processing steps and allow for the manufacturing operator to predict production time. The estimated production time can be communicated to the client.

It should be noted that the manufacturing process can further include a 3D printing process and a customization process. The 3D printing process can include a tenth step 220 of completing a 3D spruing associated with the workflow 140 of the manufacturing operator to manufacture a 3D sprue associated with the model 111 and an eleventh step 222 of completing a 3D printing associated with the workflow 140 of the manufacturing operator to manufacture a 3D print associated with the model 111. Upon completion of the 3D printing step, the 3D model 111 can be manufactured. The 3D printing process can further include a twelfth step 224 of clipping the 3D print according to the model 111 and workflow 140 of the manufacturing operator, a thirteenth step 226 of cleaning the 3D print according to the model 111 and workflow 140 of the manufacturing operator, and a fourteenth step 228 of curing the 3D print according to the model 111 and workflow 140 of the manufacturing operator.

As stated above, the manufacturing process can also include a customization process. The customization process can include at least one of the casting process, the pre-polishing process, the polishing process, the assembling process, the engraving process, and the packaging process, as associated with the workflow dataset. A fifteenth step 230 of the method, the casting process, can include casting the product 101 based on the model 111, the product attributes 126, and the workflow 140 of the manufacturing operator. A sixteenth step 232 of the method, the pre-polishing process, can include pre-polishing the product 101 based on the product attributes 126 and the workflow 140 of the manufacturing operator. A seventeenth step 234 of the method, the polishing process, can include polishing the product 101 based on the product attributes 126 and the workflow 140 of the manufacturing operator. An eighteenth step 236 of the method, the assembling process, can include assembling the product 101 based on the product attributes 126 and the workflow 140 of the manufacturing operator. A nineteenth step 238 of the method, the engraving process, can include engraving the product 101 based on the product attributes 126 and the workflow 140 of the manufacturing operator. A twentieth step 240 of the method 200, the packaging process, can include packaging the product 101 for delivery to the customer.

A twenty-first step 242 of the method includes generating a quick release (QR) code using the ERP module 114 and a twenty-second step 244 of assigning the QR code to the piece of jewelry during the manufacturing process, by the manufacturing operator, to identify the piece of jewelry throughout the plurality of processing steps. A twenty-third step 246 includes associating the QR code and the piece of jewelry in the ERP module 114, a twenty-fourth step 248 of printing a label with code, a twenty-fifth step 250 of affixing the label with code to piece of jewelry, and a twenty-sixth step 252 of providing a scanner. The method provides a twenty-seventh step 254 of scanning the QR code of the piece of jewelry with the scanner in at least one of the plurality of processing steps of the manufacturing process to generate the status associated with a location of the piece of jewelry in the process and a twenty-eighth step 256 of transmitting the status from the scanner to the ERP module 114. A twenty-ninth step 258 of the method includes permitting at least one of the manufacturing operator, by the manufacturing operator interface 122, and the administrator, by the administrator interface 120, to view the location of the piece of jewelry in the process.

A thirtieth step 260 of the method 200 includes determining, by the ERP module 114, the image having a predetermined acceptable quality associated with at least one of the plurality of processing steps. In this way, the ERP module 114 can select the image from a predetermined catalog of images having a predetermined acceptable quality.

A thirty-first step 262 of the method includes permitting the administrator, by the administrator interface 120 of the ERP module 114, to monitor a status of at least one of the plurality of processing steps of the manufacturing process in real-time. The status can associate the piece of jewelry as it is being manufactured with the workflow 140 of the manufacturing operator, and therefore, with at least one of the processing steps of the manufacturing process. As a non-limiting example, where the piece of jewelry is in the polishing process, the ERP module 114 can track the status of the piece of jewelry within the polishing step, i.e., the piece of jewelry is waiting for the polishing process to begin, the piece of jewelry is in an intermediate polishing step, and the piece of jewelry is awaiting a polishing process quality check. The status within at least one of the plurality of processing steps can allow for the administrator to know which steps have been completed and which steps remain within at least one of the plurality of processing steps and therefore processes.

In certain embodiments, monitoring of the status can be done in real time. Advantageously, this can permit the administrator to know the exact location of the piece of jewelry at any moment during the manufacturing process allowing for real-time updates to the customer and the ability to provide expected shipment dates more accurately.

A thirty-second step 264 of the method 200 includes permitting the manufacturing operator, by the manufacturing operator interface 122 of the ERP module 114, to complete a quality check of at least one of the plurality of processing steps of the manufacturing process for the piece of jewelry.

A thirty-third step 266 of the method includes obtaining, by the manufacturing operator using an image capture device, an acquired image of the piece of jewelry at one of the plurality of processing steps and a thirty-fourth step 268 of placing, by the manufacturing operator, the image capture device in communication with the manufacturing operator interface 122. The method further includes a thirty-fifth step 270 of transferring, by the manufacturing operator, the acquired image from the image capture device to the manufacturing operator interface 122 and a thirty-sixth step 272 of transmitting, by the manufacturing operator, the acquired image from the manufacturing operator interface 122 to the ERP module 114. As such, the quality check can take place.

In certain embodiments, a thirty-seventh step 274 of the method includes completing the quality check manually, by at least one of the manufacturing operator via the manufacturing operator interface 122 and the administrator by the administrator interface 120, for at least one of the plurality of processing steps of the manufacturing process for the piece of jewelry. The confirmation by either the manufacturing operator or the administrator can be done by a manual check of a check box generated within either of the manufacturing operator interface 122 or the administrator interface 120, respectively.

The thirty-seventh step 274 can further include a thirty-eighth step 276 of confirming manually, by the manufacturing operator interacting with the manufacturing operator interface 122, that the quality check has been successful to authorize the manufacturing operator to proceed to a next processing step in the plurality of processing steps of the manufacturing process for the piece of jewelry.

Alternatively to the thirty-seventh step 274, the method 200 can include a thirty-ninth step 278 of completing the quality check automatically, by an artificial intelligence application of the ERP module 114, for at least one of the plurality of processing steps of the manufacturing process for the piece of jewelry. As such, a fortieth step 280 of the method includes confirming automatically, by the artificial intelligence application, that the quality check has been successful to authorize the manufacturing operator to proceed to a next processing step in the plurality of processing steps of the manufacturing process for the piece of jewelry.

It should be appreciated that the step of the artificial intelligence application of the ERP module 114 can automatically confirm the quality check can further include a forty-fourth step 288 of pixelating the acquired image, by the ERP module 114, whereby the acquired image includes a plurality of acquired image pixels and a forty-fifth step 290 of pixelating the quality check image supplied by the ERP module 114, whereby the quality check image includes a plurality of quality check image pixels. The confirming step can further include a forty-sixth step 292 of comparing, by the artificial intelligence, the plurality of quality check image pixels to the plurality of acquired image pixels, Each one of the plurality of quality check image pixels can correspond to one of the plurality of acquired image pixels and a forty-seventh step 294 of calculating, by the ERP module 114, if enough of the plurality of quality check image pixels and the plurality of acquired image pixels match to meet the quality check threshold.

It should be appreciated that the fortieth step 280 of the artificial intelligence application of the ERP module 114 can automatically confirm the quality check can further include a forty-first step 282 of pixelating the acquired image, by the ERP module 114, whereby the acquired image includes a plurality of acquired image pixels and a forty-second step 284 of pixelating the quality check image supplied by the ERP module 114, whereby the quality check image includes a plurality of quality check image pixels. The confirming step can further include a forty-third step 286 of comparing, by the artificial intelligence, the plurality of quality check image pixels to the plurality of acquired image pixels. Each one of the plurality of quality check image pixels can correspond to one of the plurality of acquired image pixels. The method 200 can include a forty-fourth step 288 of calculating, by the ERP module 114, if enough of the plurality of quality check image pixels and the plurality of acquired image pixels match to meet the quality check threshold.

A forty-fifth step 290 of the method 200 includes verifying by at least one of the manufacturing operator and the administrator, by at least one of the manufacturing operator interface 122 and the administrator interface 120, that the quality check attributes 128 associated with the quality check satisfy a predetermined quality check threshold.

A forty-sixth step 292 of the method 200 includes generating, by the ERP module 114, the quality check attributes 128 associated with the quality check of at least one of the plurality of processing steps of the manufacturing process for the piece of jewelry where the quality check does satisfy the predetermined quality check threshold.

Alternatively to the forty-sixth step 292, where the quality check is not satisfied, the method includes a forty-seventh step 284 of requiring, by the ERP module 114, that one of the plurality of processing steps associated with the quality check be repeated where the quality check does not satisfy the predetermined quality check threshold.

The method 200 includes a forty-eighth step 296 of permitting the manufacturing operator, by the manufacturing operator interface 122, to communicate the quality check attributes 128 associated with the quality check of at least one of the plurality of processing steps to the plurality of databases.

In operation, a forty-ninth step 298 of the method 200 includes calculating, by the ERP module 114, the pricing attributes 130 associated with the manufacturing operator based on a pricing attributes algorithm, the pricing attributes algorithm including at least the quality check attributes 128 stored on the plurality of databases and associated with the manufacturing operator. In certain embodiments, the workflow variable 146 and the fixed cost variable 164 can be used in the pricing attributes algorithm. As such, the method can further include a fiftieth step 300 of obtaining from the workflow dataset, by the manufacturing operator interface 122, a set of workflow variables. The method can also include a fifty-first step 302 of obtaining from the fixed cost dataset, by the administrator interface 120, a fixed cost variable 164. A fifty-second step 304 of the method 200 can include calculating, by a pricing attributes 130 calculation in the ERP module 114, the pricing attributes 130 by processing the set of workflow variables and the fixed cost variable 164 with the pricing attributes algorithm.

In a further embodiment, the method can include a fifty-third step 306 of obtaining from the administrator, by the administrator interface 120, a price increase markup variable 168 and a fifty-fourth step 308 of storing on the at least one of the plurality of databases of the ERP module 114 the price increase markup variable 168. A fifty-fifth step 310 of the method can include calculating, by the ERP module 114, the pricing attributes 130 by processing the price increase markup variable 168 in addition to the set of workflow variables and the fixed cost variable 164 with the pricing attributes algorithm.

In another embodiment, the method can include a fifty-sixth step 312 of obtaining from the defect rate dataset 134, by the manufacturing operator interface 122, a defect rate variable 148 and a fifty-seventh step 314 of storing on the at least one of the plurality of databases of the ERP module 114 the defect rate variable. A fifty-eighth step 316 of the method can include calculating, by the ERP module 114, the pricing attributes 130 by processing the defect rate variable 148 in addition to the addition to the set of workflow variables, the fixed cost variable 164, and the price increase markup variable 168 with the pricing attributes algorithm.

A fifty-ninth step 318 of the method includes completing the manufacturing of the piece of jewelry by the manufacturer operator. The method 200 includes a sixtieth step 320 of delivering the piece of jewelry from the manufacturing operator to the customer or a third party.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments can be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A method for manufacturing a product customized by a customer, the method comprising steps of:

providing a system server having a processor and a memory on which a plurality of modules including tangible, non-transitory, processor executable instructions are stored, the plurality of modules including a production module, an enterprise resource planning (ERP) module, a marketplace module, and a platform module, the platform module in communication with the marketplace module and the ERP module, and the ERP module in communication with the production module, and the ERP module configured to generate an administrator interface and a manufacturing operator interface, the administrator interface permitting for interaction with the system server by an administrator, and the manufacturing operator interface permitting for interaction with the system server by a manufacturing operator having a manufacturing process with a plurality of processing steps, the ERP module further having a plurality of databases, at least one of the plurality of databases storing manufacturing operator attributes, product attributes, quality check attributes, and pricing attributes, wherein the manufacturing operator attributes include at least one of a workflow dataset having a plurality of processing steps associated with a workflow of the manufacturing operator, a defect rate dataset, a success rate dataset, and a labor dataset;

permitting the customer, by the platform module, to one of:

supply a model of the product directly to the ERP module, and request the model of the product from a third-party designer with access to the marketplace module, so that the third-party designer will supply the model of the product to the ERP module;

permitting the customer, by the platform module, to view the manufacturing operator attributes and the product attributes and select the manufacturing operator based on the manufacturing operator attributes, the product attributes, and the pricing attributes;

assigning to the manufacturing operator selected by the customer, by the ERP module, the model of the product to be manufactured by the manufacturing process;

beginning a manufacturing of the product, by the manufacturing operator, based on the model of the product, the manufacturing process, and the product attributes;

permitting the administrator, by the administrator interface of the ERP module, to monitor a status of at least one of the plurality of processing steps of the manufacturing process in real-time;

permitting the manufacturing operator, by the manufacturing operator interface of the ERP module, to complete a quality check of at least one of the plurality of processing steps of the manufacturing process for the product;

verifying by at least one of the manufacturing operator and the administrator, by at least one of the manufacturing operator interface and the administrator interface, that the quality check attributes associated with the quality check satisfy a predetermined quality check threshold;

one of:

generating, by the ERP module, the quality check attributes associated with the quality check of at least one of the plurality of processing steps of the manufacturing process for the product where the quality check does satisfy the predetermined quality check threshold, and requiring, by the ERP module, that one of the plurality of processing steps associated with the quality check be repeated where the quality check does not satisfy the predetermined quality check threshold;

permitting the manufacturing operator, by the manufacturing operator interface, to communicate the quality check attributes associated with the quality check of at least one of the plurality of processing steps to the plurality of databases;

calculating, by the ERP module, the pricing attributes associated with the manufacturing operator based on a pricing attributes algorithm, the pricing attributes algorithm including at least the quality check attributes stored on the plurality of databases and associated with the manufacturing operator;

completing the manufacturing of the product by the manufacturing operator; and delivering the product from the manufacturing operator to at least of the customer and a third party.

2. The method of claim 1, wherein the at least one of the plurality of databases of the ERP module also storing a fixed cost dataset, and the pricing attributes are calculated from the workflow dataset and the fixed cost dataset, the method further including steps of:

obtaining from the workflow dataset, by the manufacturing operator interface, a set of workflow variables;

obtaining from the fixed cost dataset, by the administrator interface, a fixed cost variable; and calculating, by a pricing attributes calculation in the ERP module, the pricing attributes by processing the set of workflow variables and the fixed cost variable with the pricing attributes algorithm.

3. The method of claim 2, further including steps of:

obtaining from the administrator, by the administrator interface, a price increase markup variable;

storing on the at least one of the plurality of databases of the ERP module the price increase markup variable; and calculating, by the ERP module, the pricing attributes by processing the price increase markup variable in addition to the set of workflow variables and the fixed cost variable with the pricing attributes algorithm.

4. The method of claim 3, further including steps of:

obtaining from the defect rate dataset, by the manufacturing operator interface, a defect rate variable;

storing on the at least one of the plurality of databases of the ERP module the defect rate variable; and calculating, by the ERP module, the pricing attributes by processing the defect rate variable in addition to the addition to the set of workflow variables, the fixed cost variable, and the price increase markup variable with the pricing attributes algorithm.

5. The method of claim 4, wherein the defect rate variable can be at least one of a first defect rate variable associated with a plurality of products, a second defect rate variable associated with the model according to different workflows, and a third defect rate variable associated with the workflow across all models.

6. The method of claim 1, wherein the workflow dataset is a detailed stepwise specification of a workflow of the manufacturing operator associated with the workflow dataset, the workflow dataset including at least one of a plurality of workflow steps, the plurality of workflow steps including at least one of an order intake process, a 3D spuing process, a 3D printing process, a 3D printing cleaning process, a 3D printing clipping process, a 3D printing curing process, a support removing process, a 3D printing repair process, a casting process, a pre-polishing process, a repairing process, an assembling process, a hand polishing process, and engraving process, a plating process, a final assembling process, a quality checking process, a packing process, a delivering process, and a training process.

7. The method of claim 1, wherein the quality check attributes include an image having a predetermined acceptable quality, the method further including a step of determining, by the ERP module, the image having a predetermined acceptable quality associated with at least one of the plurality of processing steps.

8. The method of claim 1, further including a step of associating, from the manufacturing operator by the manufacturing operator interface, a complexity variable stored in the workflow dataset of the ERP module and associated with at least one of the plurality of processing steps in the workflow dataset, whereby the complexity variable is used in determining a time duration of at least one of the plurality of processing steps.

9. The method of claim 2, wherein the manufacturing process further includes a 3D printing process including steps of:

completing a 3D spruing associated with the workflow of the manufacturing operator to manufacture a 3D sprue associated with the model and a training process; and completing a 3D printing associated with the workflow of the manufacturing operator to manufacture a 3D print associated with the model and the training process.

10. The method of claim 9, wherein the 3D printing process further includes steps of:

clipping the 3D print according to the model and workflow of the manufacturing operator;

cleaning the 3D print according to the model and workflow of the manufacturing operator; and curing the 3D print according to the model and workflow of the manufacturing operator.

11. The method of claim 1, wherein the manufacturing process further includes a customization process having steps of at least one of:

a casting process including casting the product based on the model, the product attributes, and the workflow of the manufacturing operator;

a pre-polishing process including pre-polishing the product based on the product attributes and the workflow of the manufacturing operator;

a polishing process including polishing the product based on the product attributes and the workflow of the manufacturing operator;

an assembling process including assembling the product based on the product attributes and the workflow of the manufacturing operator;

an engraving process including engraving the product based on the product attributes and the workflow of the manufacturing operator; and a packaging process including packaging the product for delivery to at least one of the customer and a third party.

12. The method of claim 1, wherein the product attributes include at least one of a material variable, a plating variable, a polishing variable, and an engraving variable associated with both the model and consistent with the manufacturing operator attributes of the manufacturing operator, and the method further including steps of:

selecting, by the customer with the platform module, the product attributes to customize the product; and matching, by the ERP module, the product attributes associated with the model and the manufacturing operator attributes of the manufacturing operator, wherein the product attributes allow the manufacturing operator to manufacture the model selected by the customer.

13. The method of claim 1, the method further including a step of:

one of:

completing the quality check manually, by at least one of the manufacturing operator via the manufacturing operator interface and the administrator by the administrator interface, for at least one of the plurality of processing steps of the manufacturing process for the product; and completing the quality check automatically, by an artificial intelligence application of the ERP module, for at least one of the plurality of processing steps of the manufacturing process for the product.

14. The method of claim 13, wherein the step of permitting the manufacturing operator, by the manufacturing operator interface of the ERP module, to complete the quality check of at least one of the plurality of processing steps of the manufacturing process for the product, the method further including steps of:

obtaining, by the manufacturing operator using an image capture device, an acquired image of the product at one of the plurality of processing steps;

placing, by the manufacturing operator, the image capture device in communication with the manufacturing operator interface;

transferring, by the manufacturing operator, the acquired image from the image capture device to the manufacturing operator interface; and transmitting, by the manufacturing operator, the acquired image from the manufacturing operator interface to the ERP module, whereby the quality check is to complete the quality check.

15. The method of claim 14, the method further including a step of confirming manually, by the manufacturing operator interacting with the manufacturing operator interface, that the quality check has been successful to authorize the manufacturing operator to proceed to a next processing step in the plurality of processing steps of the manufacturing process for the product.

16. The method of claim 14, wherein the quality check attributes includes a quality check image and completing, by an artificial intelligence, the quality check of at least one of the plurality of processing steps of the manufacturing process for the product further includes a step of:

confirming automatically, by the artificial intelligence application, that the quality check has been successful to authorize the manufacturing operator to proceed to a next processing step in the plurality of processing steps of the manufacturing process for the product.

17. The method of claim 16, wherein the step of confirming automatically, by the artificial intelligence application, that the quality check has been successful to authorize the manufacturing operator to proceed to a next processing step in the plurality of processing steps of the manufacturing process for the product, further includes steps of:

pixelating the acquired image, by the ERP module, whereby the acquired image includes a plurality of acquired image pixels;

pixelating the quality check image supplied by the ERP module, whereby the quality check image includes a plurality of quality check image pixels;

comparing, by the artificial intelligence, the plurality of quality check image pixels to the plurality of acquired image pixels, where each one of the plurality of quality check image pixels corresponding to one of the plurality of acquired image pixels; and calculating, by the ERP module, if enough of the plurality of quality check image pixels and the plurality of acquired image pixels match to meet the quality check threshold.

18. The method of claim 1, wherein the ERP module further includes a model generator configured to generate the model of the product based on a search entry entered by the customer to the platform module and further includes the step of requesting the model of the product from a model generator with access to the marketplace module, so that the model generator will supply the model of the product to the ERP module.

19. The method of claim 1, the method further including steps of:

generating a quick release (QR) code by using the ERP module;

assigning the QR code to the product during the manufacturing process, by the manufacturing operator, to identify the product throughout the plurality of processing steps;

associating the QR code and the product in the ERP module;

printing a label with code;

affixing the label with code to product;

providing a scanner;

scanning the QR code of the product with the scanner in at least one of the plurality of processing steps of the manufacturing process to generate the status associated with a location of the product in the process;

transmitting the status from the scanner to the ERP module; and permitting at least one of the manufacturing operator, by the manufacturing operator interface, and the administrator, by the administrator interface, to view the location of the product in the process.

20. A system for manufacturing a product customized by a customer, comprising:

a system server having a processor and a memory on which a plurality of modules including tangible, non-transitory, processor executable instructions are stored, the plurality of modules including a production module, an enterprise resource planning (ERP) module, a marketplace module, and a platform module, the platform module in communication with the marketplace module and the ERP module, and the ERP module in communication with the production module, and the ERP module configured to generate an administrator interface and a manufacturing operator interface, the administrator interface permitting for interaction with the system server by an administrator, and the manufacturing operator interface permitting for interaction with the system server by a manufacturing operator having a manufacturing process with a plurality of processing steps, the ERP module further having a plurality of databases, at least one of the plurality of databases storing manufacturing operator attributes, product attributes, quality check attributes, and pricing attributes, wherein the manufacturing operator attributes include at least one of a workflow dataset having a plurality of processing steps associated with a workflow of the manufacturing operator, a defect rate dataset, a success rate dataset, and a labor dataset, the system server configured to:

permitting the customer, by the platform module, to one of:

supply a model of the product directly to the ERP module, and request the model of the product from a third-party designer with access to the marketplace module, so that the third-party designer will supply the model of the product to the ERP module;

permitting the customer, by the platform module, to view the manufacturing operator attributes and the product attributes and select the manufacturing operator based on the manufacturing operator attributes, the product attributes, and the pricing attributes;

assigning to the manufacturing operator selected by the customer, by the ERP module, the model of the product to be manufactured by the manufacturing process;

beginning a manufacturing of the product, by the manufacturing operator, based on the model of the product and the manufacturing process;

permitting the administrator, by the administrator interface of the ERP module, to monitor a status of at least one of the plurality of processing steps of the manufacturing process in real-time;

permitting the manufacturing operator, by the manufacturing operator interface of the ERP module, to complete a quality check of at least one of the plurality of processing steps of the manufacturing process for the product;

verifying by at least one of the manufacturing operator and the administrator, by at least one of the manufacturing operator interface and the administrator interface, that the quality check attributes associated with the quality check satisfy a predetermined quality check threshold;

one of:

generating, by the ERP module, the quality check attributes associated with the quality check of at least one of the plurality of processing steps of the manufacturing process for the product where the quality check does satisfy the predetermined quality check threshold, and requiring, by the ERP module, that one of the plurality of processing steps associated with the quality check be repeated where the quality check does not satisfy the predetermined quality check threshold;

permitting the manufacturing operator, by the manufacturing operator interface, to communicate the quality check attributes associated with the quality check of at least one of the plurality of processing steps to the plurality of databases;

calculating, by the ERP module, the pricing attributes associated with the manufacturing operator based on a pricing attributes algorithm, the pricing attributes algorithm including at least the quality check attributes stored on the plurality of databases and associated with the manufacturing operator;

completing the manufacturing of the product by the manufacturing operator; and delivering the product from the manufacturing operator to at least one of the customer and a third party.

* * * * *